Sept. 20, 1932. R. W. CANFIELD 1,878,465
GLASSWARE FORMING APPARATUS
Filed Nov. 17, 1928 12 Sheets-Sheet 2

Witness:
A. A. Horn.

Inventor
Robert W. Canfield
by Parker & Brown
Attorney.

Sept. 20, 1932. R. W. CANFIELD 1,878,465
GLASSWARE FORMING APPARATUS
Filed Nov. 17, 1928 12 Sheets-Sheet 3

Witness:
A. A. Horn

Inventor
Robert W. Canfield
by Robert S. Burn
Attorney.

Sept. 20, 1932.    R. W. CANFIELD    1,878,465
GLASSWARE FORMING APPARATUS
Filed Nov. 17, 1928    12 Sheets-Sheet 6

Witness:
A. A. Horn

Inventor
Robert W. Canfield
by Ritter & Crown
Attorney.

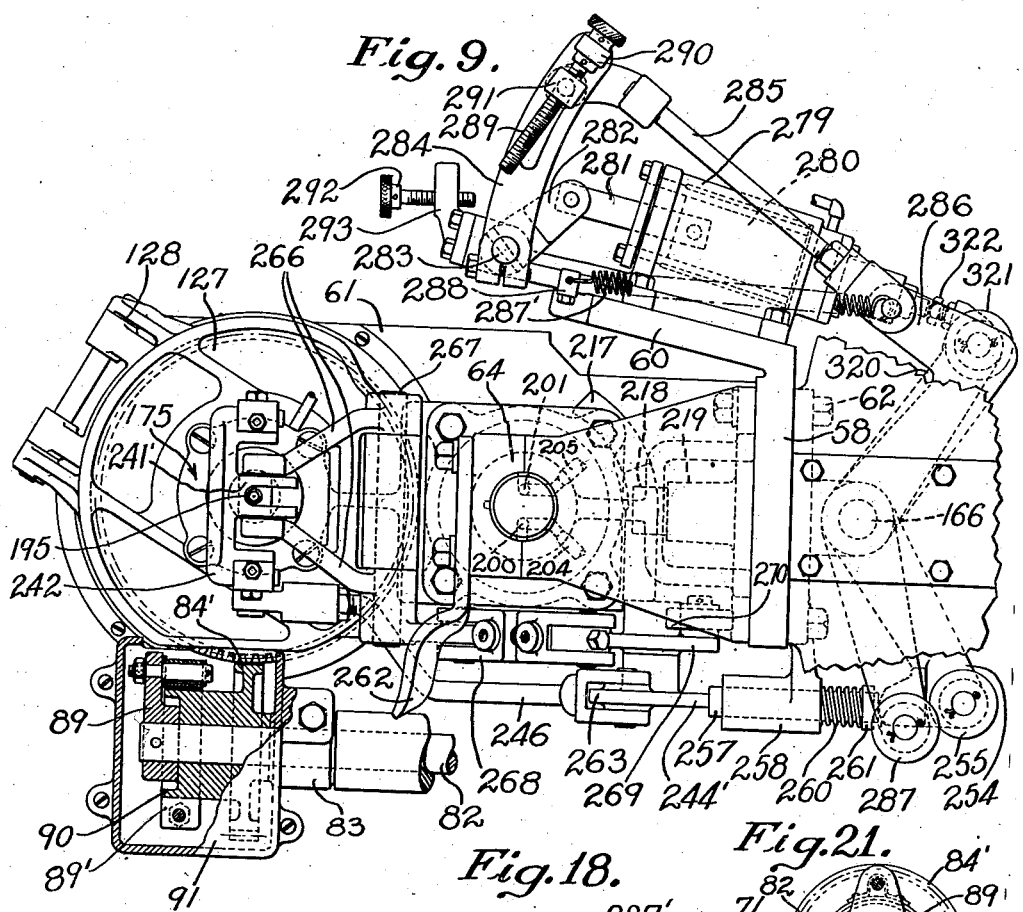
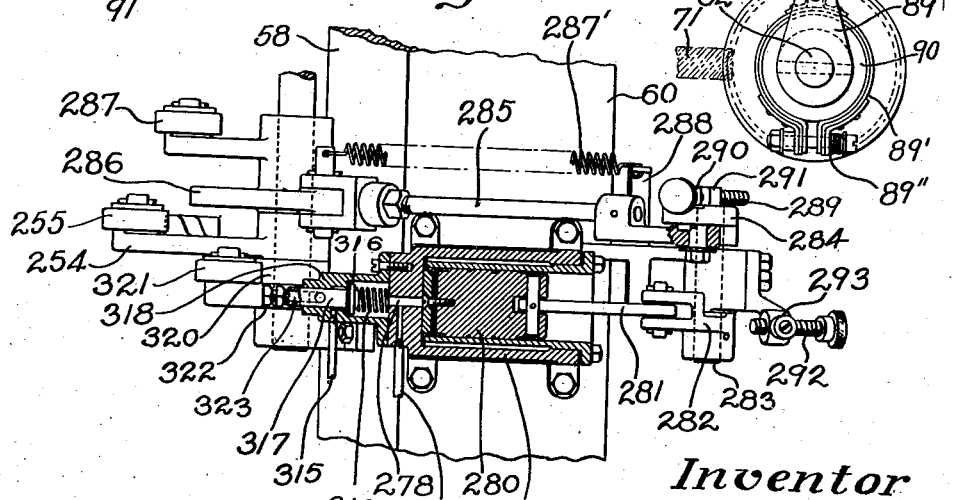

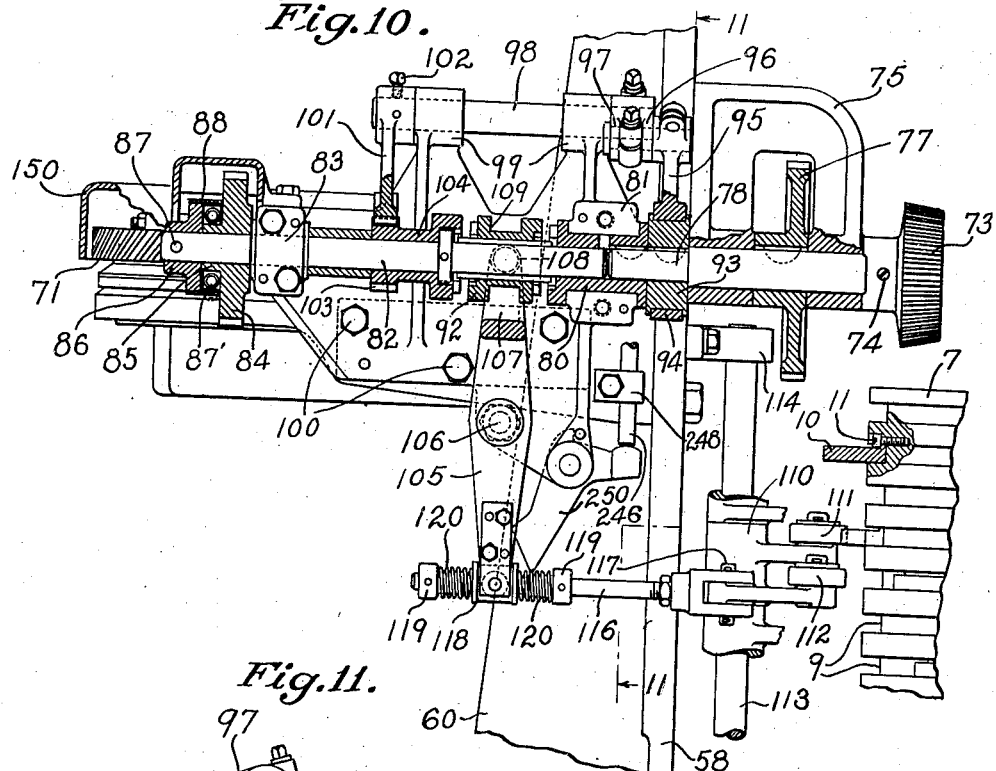

Sept. 20, 1932. R. W. CANFIELD 1,878,465
GLASSWARE FORMING APPARATUS
Filed Nov. 17, 1928 12 Sheets-Sheet 9

Witness:
A. A. Horn

Inventor
Robert W. Canfield
by Artson & Brown
Attorney.

Sept. 20, 1932.   R. W. CANFIELD   1,878,465
GLASSWARE FORMING APPARATUS
Filed Nov. 17, 1928   12 Sheets-Sheet 11

Witness:
A. A. Horn

Inventor
Robert W. Canfield
by
Attorney.

Sept. 20, 1932.  R. W. CANFIELD  1,878,465
GLASSWARE FORMING APPARATUS
Filed Nov. 17, 1928   12 Sheets-Sheet 12

Witness:
A. A. Horn

Inventor
Robert W. Canfield
by Robson D Binn
Attorney.

Patented Sept. 20, 1932

1,878,465

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

GLASSWARE FORMING APPARATUS

Application filed November 17, 1928. Serial No. 320,109.

My invention relates to a machine for making hollow glassware, and more particularly to a continuously operating and entirely automatic machine for making glassware of the so-called "paste mold" type. As such, my present invention is an improvement upon the several devices shown in my copending application, Serial No. 31,315, filed May 19, 1925, now Patent 1,756,813, issued April 29, 1930 which was directed to hand operated machine, and in my prior Patent No. 1,609,691 issued December 7, 1926.

Among the objects of my present invention are to provide a machine having all of the functions and advantages of the machine shown in my copending application above referred to combined with completely automatic operation.

A further object of the invention is to provide a glassware forming machine in which a neck ring is alternatively rotatable or oscillatable and in which an oscillation of the neck ring may be effected by smoothly reversing means, such as a means having a substantially harmonic motion.

A further object is to provide a glassware forming mechanism including a neck ring and a head cooperating therewith for working the glass therein, wherein provision is made for positively opening the neck ring at the termination of an article forming operation and for positively ejecting the completed article and preventing its sticking to the head.

Further objects of the invention are to provide in a continuously operating machine, an arrangement whereby a press and blow head is movable in a substantially vertical direction toward and away from a neck ring and in which a blank mold is also movable in a substantially vertical direction toward and away from the neck ring; to provide a device in which the neck ring may be positively closed and locked against opening movement by the blank mold; to provide a device whereby the blank mold may be adjusted vertically with respect to its moving means.

A further object of the invention is to provide interlocking devices between the press and blow head on the one hand, and the blank mold on the other, whereby the desired order of operations of the article forming cycle is insured.

A further object of the invention is to provide an automatic glassware forming machine in which the pressing plunger may be retracted independently of other operations such as the lowering of the blank mold, and preferably the timing of the operation of each of these parts may be effected independently of the other.

A further object of the invention is to provide, in a machine for forming hollow glass articles, a peculiar and novel arrangement of air supply means, wherein there is a puff blowing means and a separate final blowing means, and in which means are provided for venting the interior of a blown article at the termination of the desired final blowing period, the vent not being opened at the termination of the puff blow.

A further object of the invention is to provide a machine of the above described character in which there is a burner for reheating the parison and for controlling its shape during the elongation under gravity or in response to the puff blowing thereof, in which the burner is mounted on a universal support, so that it may direct a flame or a jet of compressed air against the parison at any desired angle.

A further object of the invention is to provide a final blow mold having a separate and independently movable bottom plate which is adapted to be moved in a substantially vertical direction with respect to the lateral mold parts for the purpose of pushing up the bottom of an overlong parison or for the purpose of permitting the use of a convex bottom plate for making articles of the type of tumblers with concave bottoms. It is another object of this invention to provide a novel means for effecting the upward movement of the bottom plate and the closing of the lateral mold parts, wherein a common closing means is employed for both of these purposes.

A further object of the invention is to provide a turret type ware forming machine in which the final blow mold is situated adjacent to the outer end of an arm which is adapted to swing in a substantially horizontal plane and in which means are provided for swinging the arm and for opening and closing the mold parts located at the outer end thereof, the means being entirely automatic and preferably also depending upon the rotation of the turret.

A further object of the invention is to provide in connection with a machine of the above described character, a blow mold mounted on the outer end of a horizontally swinging arm.

A further object of the invention is to provide an improved type of take-out mechanism specifically adapted to use with this type of continuously rotating turret glass forming machine.

Further objects and advantages of the present invention will be apparent from a reading of the subjoined specification and claims when taken in connection with the accompanying drawings, in which:—

Fig. 9 is a plan view of a unit such as is shown in elevation in Fig. 5 with certain parts broken away;

Fig. 10 is a view partly in vertical section and partly in elevation showing the means for rotating or oscillating a neck ring and the clutch for shifting from one of such movements to the other;

Fig. 11 is a section partly on the line 11—11 in Fig. 10, showing the drive means for oscillating the neck ring;

Fig. 18 is a fragmentary combined elevation and sectional view similar to Fig. 17, but showing a modified construction, that shown in Fig. 18 being the preferred form;

Fig. 21 is a detail showing of the friction drive for the neck ring shown in Fig. 5.

Figure 1:
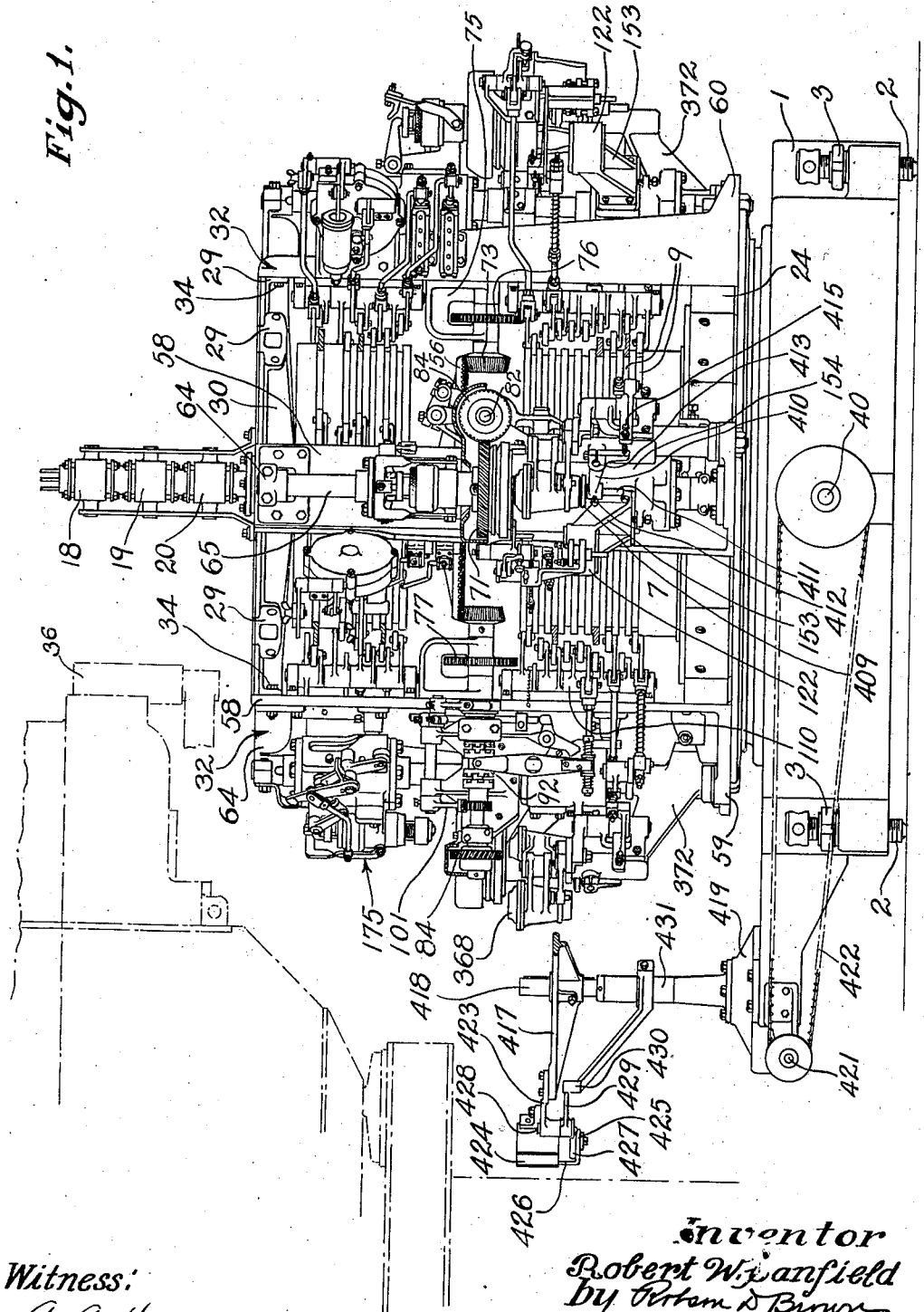
Figure 1 is an elevation of the entire machine showing its relation to a glass feeding device, certain parts being omitted for the sake of clearness.

In general, my device comprises a continuously rotating turret having a plurality of similar article forming units arranged around its periphery, in this case eight, and a series of stationary but adjustable cams arranged inwardly of the said units with which the moving parts of each of the units cooperate to effect the desired cycle of operation in each unit, the cycle of each unit being the same as that of any other but offset therefrom as to phase. Charges of glass of the desired weight and shape are supplied to each unit at a particular point in the rotation thereof and are worked upon during the continuous rotation of the turret, so that the completed article formed from the charge in question will be discharged prior to the unit arriving again at the feeding point. I also contemplate the possible arrangement of a machine in which two or more complete article forming cycles take place during a single revolution of the machine or in which a single cycle is extended over more than one revolution of the turret, but the present machine, shown for purposes of illustration, is designed so that one revolution of the turret equals one complete cycle for each unit.

Each unit comprises essentially the following elements; a neck ring, a blank mold, a combined pressing and blowing head, a burner, a necking tool, and a final blow mold.

The cycle is in general as follows. Starting with the blank mold raised to close the neck ring and the press and blow head raised and swung to one side, a charge of glass is supplied to the blank mold; second, the press and blow head is swung laterally and moved downwardly, so that it presses the charge of glass to form a pressed blank; third, the pressing plunger within the head is then tripped and moves upwardly a predetermined amount away from the glass, and in so doing, opens up the blowing passages to the inside of the neck ring; fourth, the blank mold is then swung downwardly and laterally, thus permitting access to the blank of the subsequently used mechanisms; fifth, the blank is then heated by the burner and preferably simultaneously rotated or oscillated as desired, and is also blown to some extent by the puff blowing mechanism, thus elongating under the combined action of gravity and the puff blowing air, controlled to a desired extent by the burner; sixth, during or after this elongation, the necking tool is swung in to constrict a neck portion of the parison as desired, the parison being meanwhile rotated or oscillated as desired; seventh, the parison is now ready to be finally blown and the necking tool and burner are moved out of the way and the final blow mold is swung in from its inoperative position and surrounds the parison, whereupon it is closed and final blowing air is admitted to the inside of the parison for final blowing, during which time the parison is also rotated or oscillated as desired and as is usual in paste mold operation; eighth, the final blow mold is then opened and swung to its inoperative position and the head is moved upwardly, substantially simultaneously with which the neck ring is positively opened permitting the discharge of the finally blown article; and an ejecting means is operated to prevent the article from sticking to the head and thus causing its ejection. Suitable means are preferably provided for receiving the ejected article and moving it to a desired position, from which it may be taken by mechanical or manual means to an annealing lehr or some other subsequent operation followed by annealing.

STRUCTURE OF THE MACHINE AS A WHOLE

*Base and stationary structure*

The device, as a whole, is mounted on a base 1 (Figs. 1, 2 and 3) which is provided with suitable leveling jack screws 2 having jam nuts 3 thereon, for the purpose of holding them in predetermined adjusted position, the screws serving to retain the base level upon the floor of the plant in which it is installed. A second casting 4 (Fig. 3) is mounted upon the base and constitutes an auxiliary base member which is made separate for convenience in construction, this member being suitably secured to the base 1. A hollow column 5 is secured to the member 4 as by bolts 6 and extends vertically centrally of the base. This column is smaller in diameter at stepped intervals from the bottom toward the top thereof.

Figure 13:
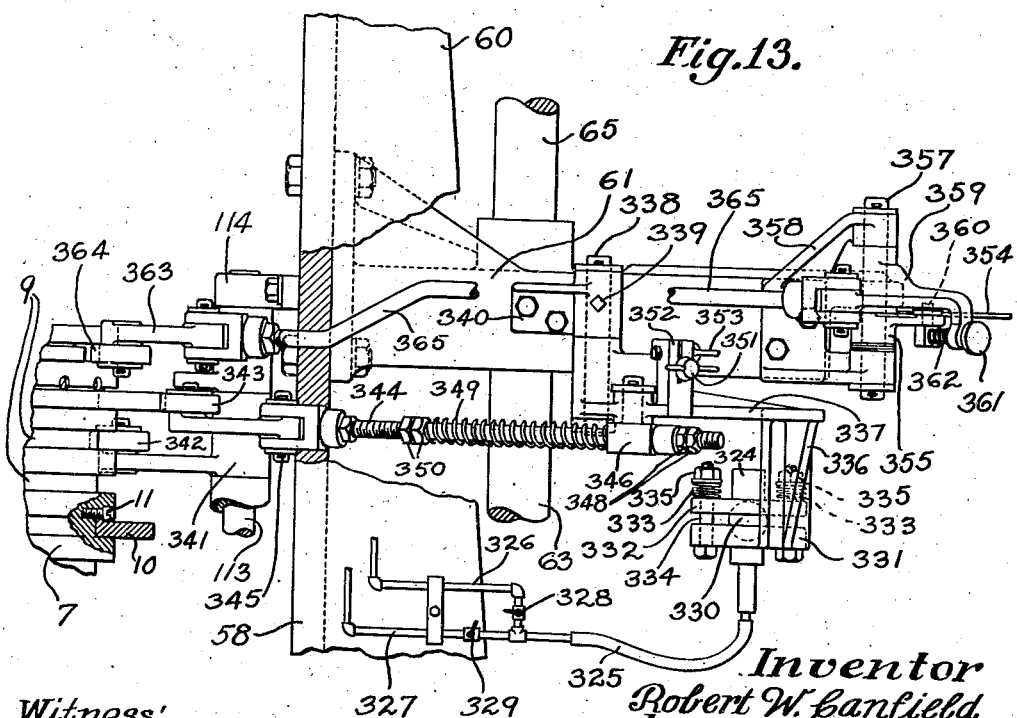
Fig. 13 is an elevation of the parts shown in Fig. 12, certain parts being broken away and in section.

A lower cam holding drum 7 is rigidly mounted on the base member 4 as by bolts 8 and is provided with suitable annular slots 9 for the reception of cam members indicated generally at 10 which are provided with inner flanges as shown in detail in Figs. 10 and 13. The cam members 10 are retained in the slots 9 by set screws 11 extending into the drum 7 and thus each cam is angularly adjustable around its slot 9 for the purpose of varying the timing of the particular mechanism operated thereby. A similar upper cam holding drum 12 (Fig. 3) is provided for the reception of further cams 10 in the same manner as the drum 7 above described, the drum 12 being stationary and secured to an upper portion of the stationary column 5 as by a set screw 13 and a key 14.

Figure 3:
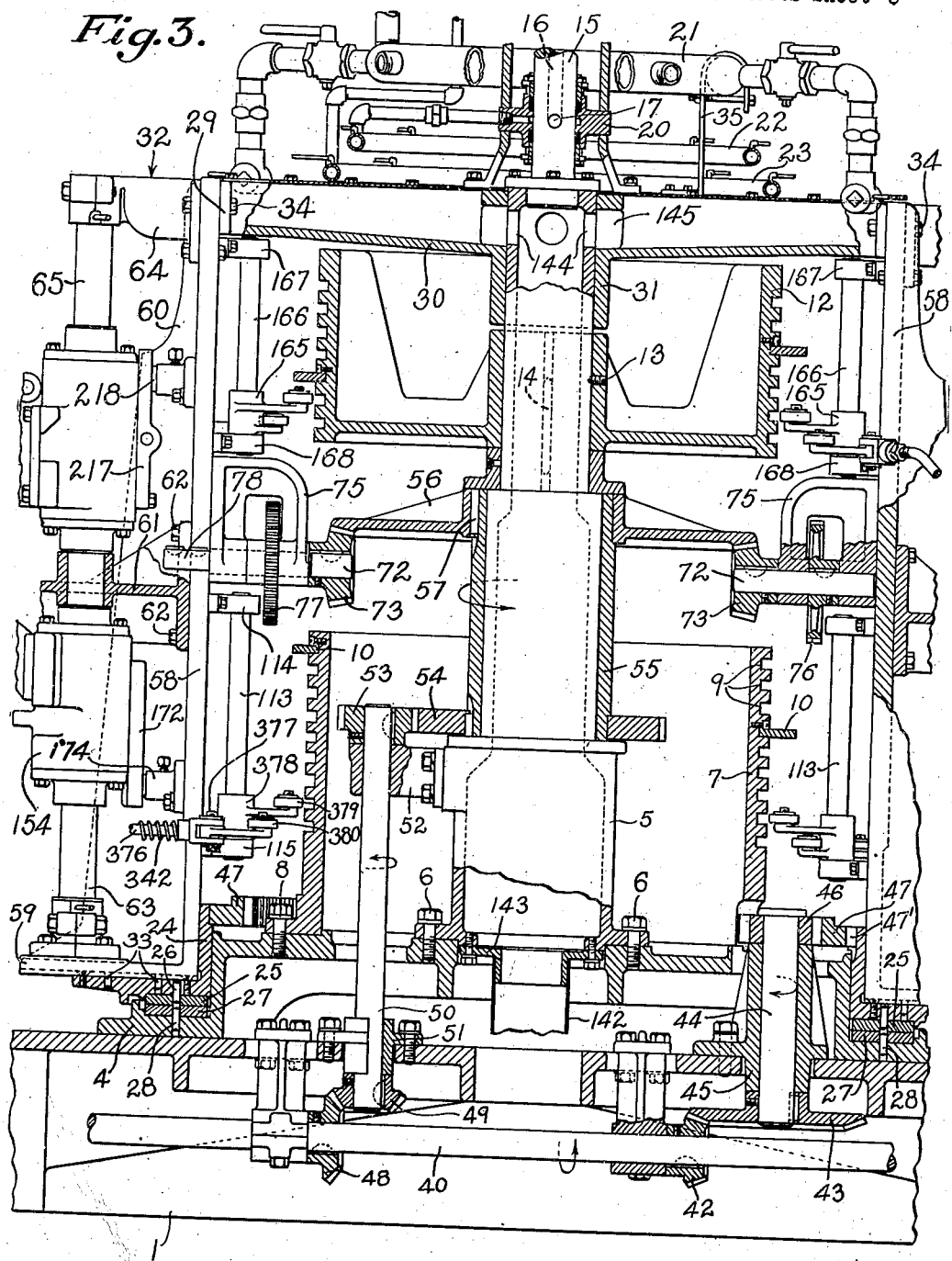
Fig. 3 is a vertical section substantially through the center of the machine, but with certain parts broken away and others omitted for clearness.

The column 5 is provided at its top with a stationary extension 15 which has three longitudinally extending passages therein, such as the one shown at 16 and each having a laterally extending passage such as 17 communicating therewith in alignment with suitable distributing members, such as the collars 18, 19 and 20 (Fig. 1) for air, water and gas respectively. These distributing members resceive the several fluids from the lateral passages, such as 17 (Fig. 3), and distribute them to annular pipes 21, 22 and 23, which are mounted to rotate with the turret and serve as distributing pipes for the fluids from the center column 15, the annular pipes serving to distribute the several fluids to the several units through branch pipes as indicated in Fig. 3. The details of this distributing system form no part of my present invention, and therefore have not been illustrated or described with great particularity.

*Main turret, parts connected therewith and driving means*

The main turret which is adapted to rotate about the axis of the center column 5 comprises a lower turret ring 24 (Fig. 3) to which the lower ends of the several units are secured. The ring 24 is provided with an annular bearing member 25 suitably secured thereto, as by dowels 26, the bearing ring 25 being adapted to slide upon a similar but stationary bearing ring 27 secured as by dowels 28 to the base member 4 and being separated therefrom by a thin firm of oil or suitable lubricating material. The upper ends of the several units are secured to plates 29 formed upon the ends of hollow spider arms 30 secured to or integral with a center collar 31 rotatable upon the upper reduced portion of the column 5.

The lower turret ring 24 and the plates 29 are tied together by the several forming units, generally indicated at 32, the units being positioned on the lower turret ring in this case by a key held by dowels 33 at the bottom and also bolted thereto in a manner not shown in detail, and being secured to the plates 29 by bolts 34. The annular pipes 21, 22 and 23 are preferably secured to the spider 30 in any desired manner as by hook members 35.

The machine is preferably driven in common with a glass feeding device indicated in dotted lines at 36 (Figs. 1 and 2) through a drive shaft 37 (Fig. 2) which may be provided with a suitable universal joint 38 and a clutch mechanism generally indicated at 39 through which the drive shaft 37 may be connected or disconnected at will to the main drive shaft 40 of the machine. In Fig. 2, I have indicated a worm and gear 41 for transmitting the driving motion from the shaft 37 to the shaft 40.

If desired, a suitable type of phase changing device may be inserted between the drive to the feeder and shaft 37 for insuring the proper phase relation between the feeder and machine and also some suitable overload cutoff or a simple shearing pin may be used in the drive of the machine to prevent breakage in the event of an overload.

Referring now to Fig. 3, the shaft 40 is provided with a bevel pinion 42 keyed thereto as indicated and adapted to mesh with a bevel gear 43 secured to the lower end of a vertical shaft 44 journaled in a suitable bearing member 45 secured to the base 1. A pinion 46 fixed to the upper end of shaft 44 meshes with an internal annular gear or rack 47 suitably secured as by a key 47' to the lower turret ring 24, this constituting the driving means for the turret.

A second bevel gear 48 (Fig. 3) is secured to the main drive shaft 40 and meshes with a bevel gear 49 secured to the lower end of a vertical shaft 50 pivoted in suitable bearing members 51 and 52 mounted on the base 1 and the vertical column 5 respectively. At its upper end, the shaft 50 is provided with a pinion 53 which is adapted to mesh with a gear 54 keyed to the lower end of a sleeve 55 journaled on an intermediate portion of the stepped column 5. A suitable bevel gear member 56 is secured to the upper end of the sleeve 55 as by a key 57 and is adapted to transmit motion to the several units for the purpose of rotating or oscillating the neck rings in a manner hereinafter to be described. Due to the arrangement of the gearing above described, the sleeve 55 will rotate in a direction opposite to the main turret and hence will provide a greater speed of rotation to the neck ring rotating means than if the reverse were true.

*Individual units, construction of frame, etc.*
*(Figs. 1, 2, 3, 6, 7, 19 and 20)*

Figure 7:
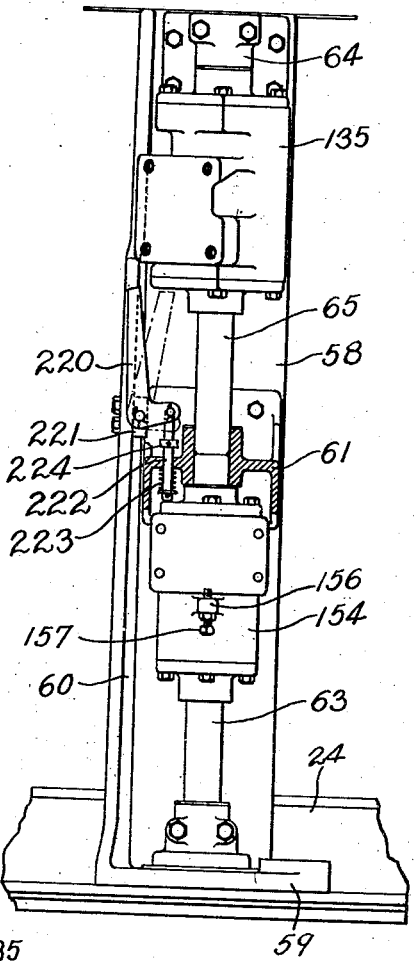

Referring particularly to Fig. 3, the unit 32 comprises a main casting including a vertical rear portion 58 and a horizontal lower or base portion 59 secured to the lower turret ring 24 as above described. A lateral web or flange 60 is secured to or integral with the portion 58 and the bottom portion 59 and is adapted to support certain parts of the operating mechanism. Substantially midway of the frame 58, a member 61, hereinafter termed a neck ring shelf, is provided and is preferably secured to the main frame by bolts 62. Extending between the neck ring shelf and a suitable bracket on the base portion 59 is a column or shaft 63 for a purpose hereinafter to be described and extending between the neck ring shelf 61 and an upper bracket 64 is a similar column 65 separate and aligned with the shaft 63, also for a purpose later to be described. In Fig. 7, these shafts 63 and 65 are shown as separate and received in a common collar in the neck ring shelf 61.

*Neck ring and associated mechanism*
*(Figs. 1, 3, 4, 5, 9, 10 and 11)*

Supporting and rotating or oscillating the neck ring

Figure 4:
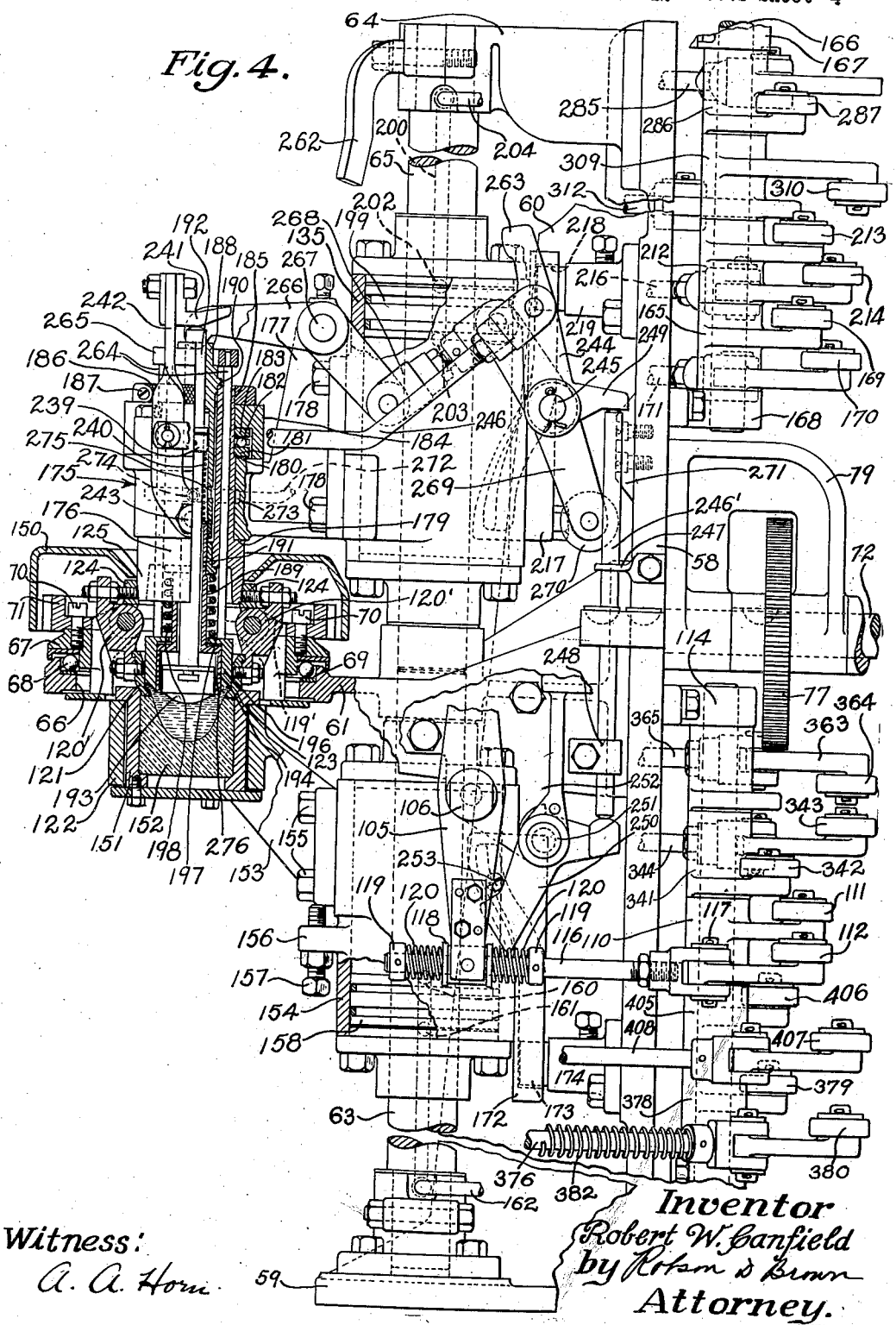
Fig. 4 is an elevation partly in vertical section showing a single unit which is fixed to the main turret and showing in particular the press and blow head in pressing position, and one form of the mechanism associated therewith.

Referring particularly to Fig. 4, it is seen that an aperture 66 is formed in the outer end of the neck ring shelf 61 and receives therein a neck ring supporting member 67 which is supported by ball bearings 68 on a suitable raceway formed in a shoulder or rabbet 69. To the member 67 is secured as by bolts 70, a helical gear 71 by which the neck ring may be rotated or oscillated in a manner presently to be described.

Figure 5:
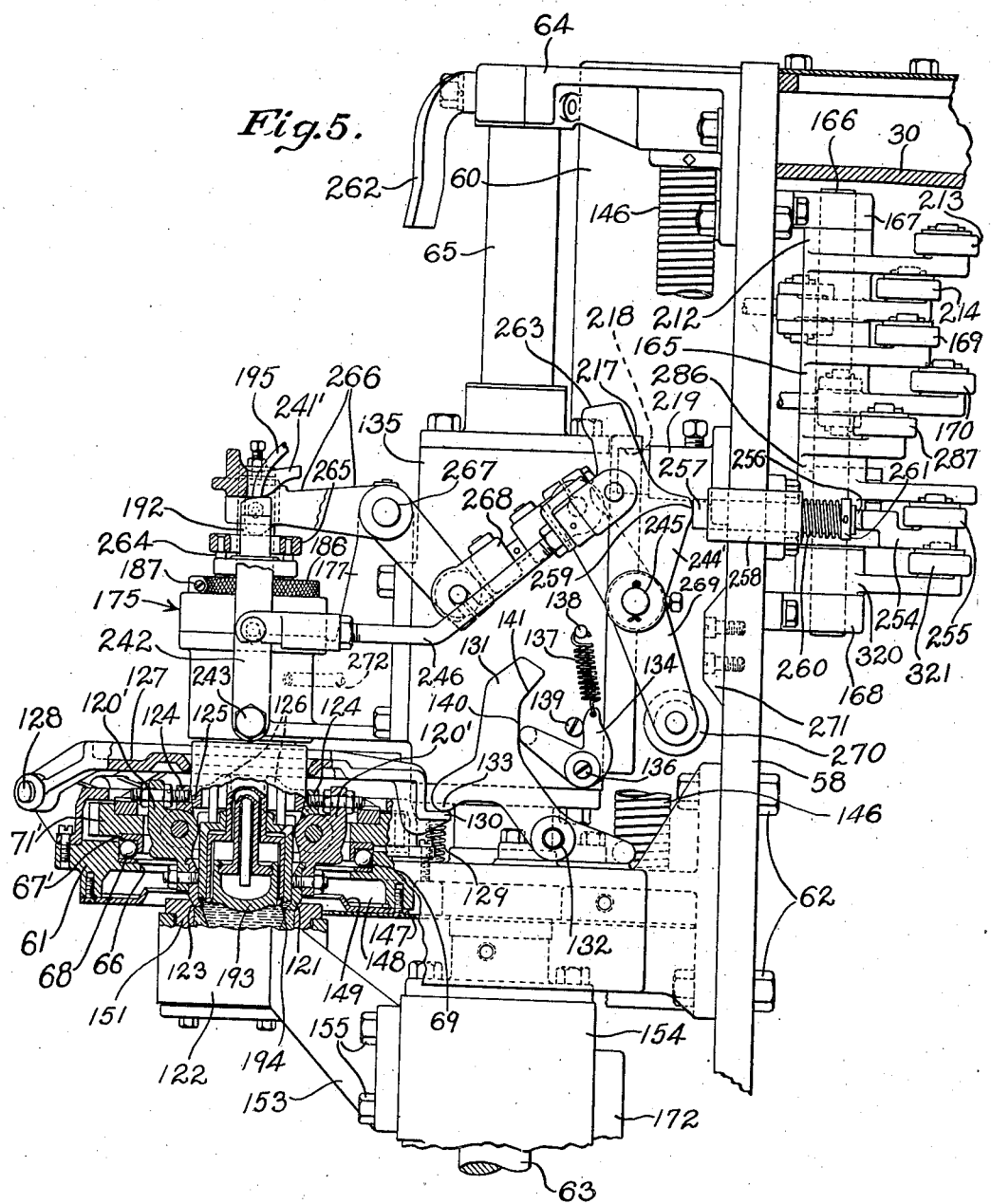
Fig. 5 is a view generally similar to Fig. 4, but showing certain parts in modified form, the form of the mechanism shown in Fig. 5 being in general preferred to that shown differently in Fig. 4.
Figure 6:
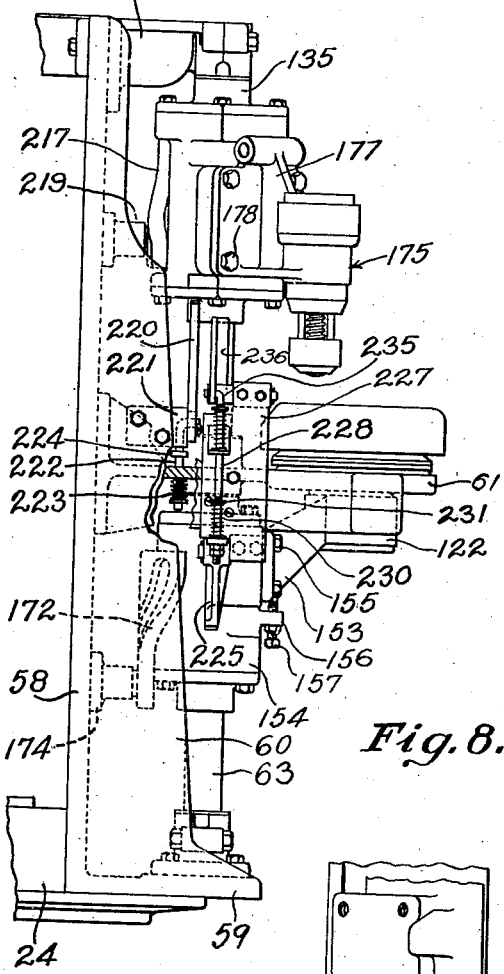
Figs. 6, 7 and 8 are views in elevation with parts broken away and other parts in section to show the interlocking devices between the press and blow head on the one hand and the blank mold on the other.

The construction illustrated in Fig. 5 differs slightly from that shown in Fig. 4 in that the supporting member 67' is made lighter and may be considered only a raceway and the helical gear 71' is thus positioned closer to the ball bearings 68; the parts being secured together in any desired manner, but no securing means, such as the bolts 70, being specifically shown.

Referring particularly to Figs. 2, 3, 10 and 11, I provide means for each unit for rotating or oscillating the neck ring comprising a radially disposed shaft 72 (Fig. 3) provided on its inner end with a bevel gear 73 which may be secured thereto in any suitable manner as by a set screw 74 (Fig. 10). The gear 73 of each unit meshes with and is driven by the bevel gear 56, which is driven as above described. The shaft 72 is suitably journaled in a bracket member 75 suitably fixed to the portion 58 of the unit frame. A gear 76 is suitably secured, as by a key, to the shaft 72 and meshes with and drives a second gear 77 upon a shaft 78 (Figs. 1 and 2) mounted journaled in a portion 79 of the bracket 75 (Fig. 2) and parallel with the shaft 72 but offset laterally therefrom. The shaft 78 is secured as by a suitable key at its outer end to a sleeve member 80 (Fig. 10), the latter being provided with an annular peripheral groove which is received within the bearing member 81. Thus it will be seen that the shaft 78 is continuously driven during the continuous rotation of the turret through the gears 56, 73, 76 and 77.

A shaft 82 (Fig. 10) is positioned in prolongation of, but unconnected with, the shaft 78, and having its right hand or inner end (Fig. 10) journaled for rotation in the sleeve member 80 and also journaled in a suitable bearing 83. This shaft is arranged to drive the gear 71 or 71' of the neck ring support. I have shown two forms of such drive, one in Fig. 9 and the other in Fig. 10, the former being the preferred form.

Referring first to Fig. 10, a helical gear 84 is loosely mounted adjacent to the outer end of the shaft 82 and is provided with an extension 85 having a plurality of segments extending radially outwardly therefrom. A collar member 86 is suitably secured to the outer end of the shaft 82 as by a pin 87 and is provided with segments extending between the segments on the extension 85 and separated therefrom by suitable compression springs 87'. Thus it will be seen that the drive between the member 86 and the gear 84 is resilient in its nature due to the interposition of the compression springs 87'. A suitable sleeve 88 may be positioned about the interengaging segments for the purpose of keeping dust and other foreign material out of the springs 87'.

Referring to Fig. 9, I have shown a preferred form of drive between the shaft 82 and the helical gear 84' corresponding generally to gear 84 shown in Fig. 10, this preferred form comprising a suitable crank member 89 (see also Fig. 21) secured to the outer end of the shaft 82 and provided with a friction band 89' surrounding a drum 90, which is secured to the gear 84', the drum 90 and the gear 84' being loosely received upon the shaft 82. The friction band 89' is retained tight about the drum 90 by a compression spring 89'' (Fig. 21). It will be seen that by this arrangement, if sufficient resistance is presented to rotating movement of the neck ring, no damage can come to the other parts of the machine, as the band will merely slip around the drum 90. The gear 84' and its driving means are preferably enclosed in the preferred embodiment of my invention in a protective casing 91.

Figure 2:
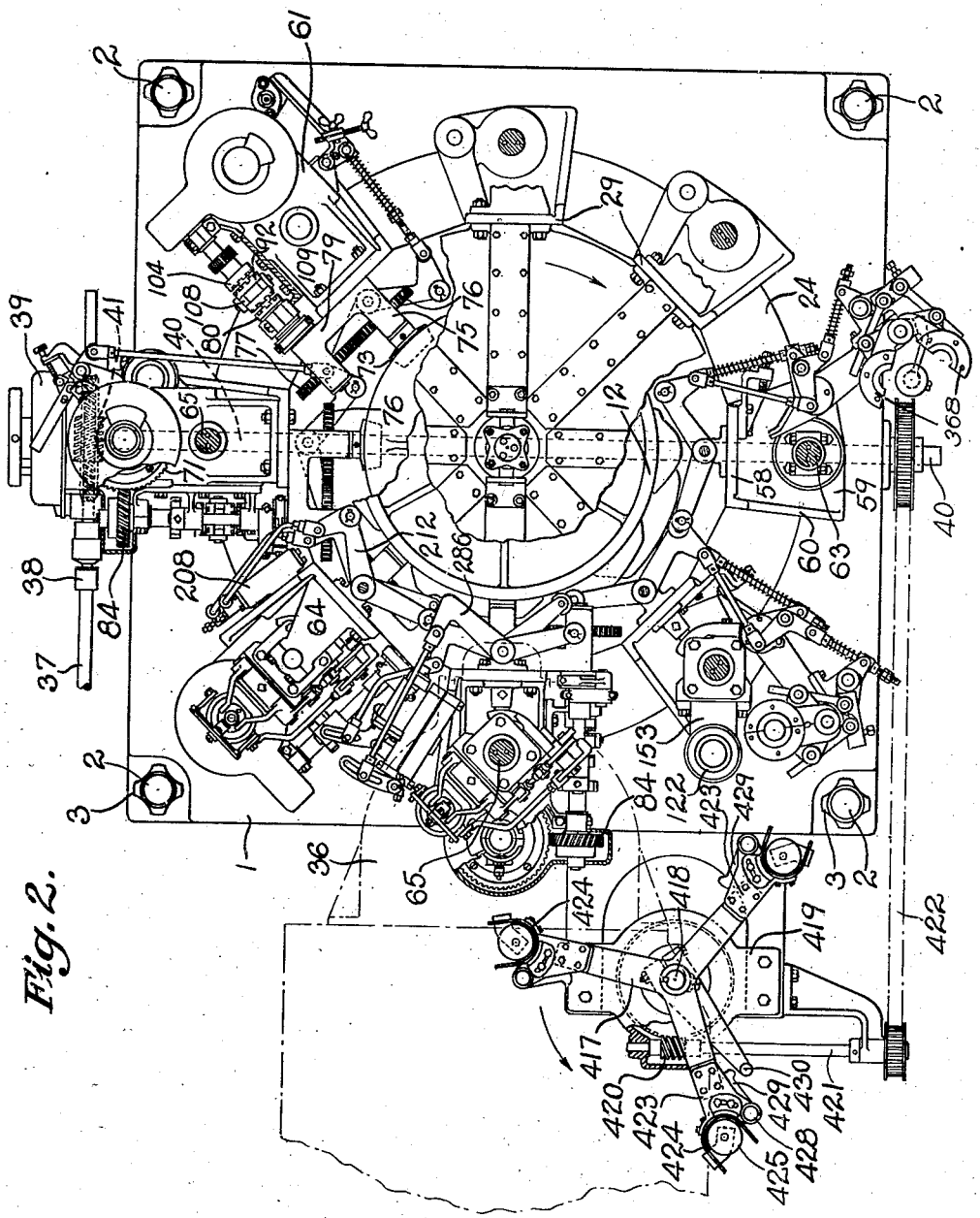
Fig. 2 is a plan view of the machine with certain parts omitted and others broken away and in section.

Referring to Figs. 1 and 10, I provide means for either rotating or oscillating the neck ring by rotating or oscillating the shaft 82, or for causing a cessation of both movements. This means comprises a double faced clutch component 92 splined to the shaft 82 and having its right hand face, as seen in Fig. 10, provided with engaging clutching elements for cooperation with complementary elements on the left hand end of the collar member 80, so that when the clutch member 92 is moved to the right, as seen in Fig. 10, the shaft 82 will be positively rotated in a single direction as if fixed to the shaft 78.

For the purpose of oscillating the shaft 82, I provide on the shaft 78 an eccentric 93 (Fig. 1, 10 and 11) which receives an eccentric band 94 on a link 95. The link 95 is pivoted at 96 to a crank 97 secured to one end of a shaft 98 journaled in bearings 99 suitably secured to the neck ring shelf 61, as by bolts 100. At its opposite end the shaft 98 is provided with a segment gear 101 secured thereto as by a set screw 102 and adapted to engage a pinion 103 formed on a sleeve member 104, the right hand end of which, as seen in Fig. 10, is provided with suitable clutching members for interengagement with complementary clutching members of the left hand side of the clutch member 92. The sleeve 104 is loosely received on the shaft 82 and has no driving connection therewith except through the clutch member 92 when in its left hand position.

It will be obvious from the above description that when the clutch member 92 is at its left hand or outer position in engagement with the sleeve member 104, the shaft 82 will be oscillated and the neck ring will be oscillated thereby through the above described gearing and that this oscillation will be substantially harmonic due to its being derived from the eccentric 93 on the shaft 78.

I provide means for shifting from a rotation to an oscillation of the neck ring or vice versa, or for causing a cessation of both movements as desired, this means comprising a lever 105 (Figs. 10 and 11) pivoted at 106 to the neck ring shelf and provided at its upper end with a bifurcated portion 107 having inwardly directed pins or rolls 108 (Figs. 2 and 11) which are received in an annular slot or groove 109 of the clutch member 92.

For moving the lever 105, I provide a rocker member 110 having a pair of cam rolls 111 and 112 disposed at the outer ends of substantially oppositely directed arms and cooperable with suitable cams on the lower cam drum 7 to control positively the position of the member 110. The member 110 is journaled upon a rocker shaft 113 rigidly mounted in suitable supports 114 and 115 as seen in Figs. 3 and 10, the supports being secured to the frame portion 58 of the unit. A link 116 is pivoted at 117 to a part of the member 110 at a point spaced from the shaft 113 and is adapted to impart motion therefrom to the lower end of the lever 105. For this purpose, I provide a resilient connection comprising a sleeve 118 pivoted to the lower end of the lever 105 and disposed about the link 116. Suitable collar members 119 are secured to the link 116 and compression springs 120 extend between these collar members and the sleeve 118, so that motion of the link is resiliently transmitted to the lever 105. The purpose of this is to permit the proper engagement of the clutch, inasmuch as the member 110 may be turned by its controlling cams at a time when the interengaging clutch members are not opposite one another.

It will be seen that the sleeve members 80 and 104 are spaced a sufficient distance apart so that the clutch member 92 may be disposed between them and out of engagement with either one, permitting the neck ring to remain stationary during the continuous operation of the machine.

The use of the oscillating neck ring becomes important in making ware such as optic tumblers, wherein it would be undesirable to rotate them continuously in one direction during their formation and especially with respect to the final blow mold due to the twisting tendency which might produce a product having its facets twisted instead of straight, as desired, or otherwise distort them.

*Neck ring opening, closing and locking means*
*(Figs. 4 and 5)*

The gear 71 or 71' as the case may be is provided with two diametrically disposed pairs of inwardly extending ears 119' which pivotally support neck ring carriers 120', to each of which one-half or section 121 of a neck ring is detachably secured. The gears 71 or 71' and the neck ring carried thereby are rotated or oscillated to spin the blank during the blowing and necking-in operations as above described. The pivots between the ears 119' and the neck ring supporting members 120' are parallel to each other and disposed in a horizontal plane.

The neck ring halves are adapted to be moved into closed position by contact with an upper portion of a blank mold generally indicated at 122 which moves in a substantially vertical direction when adjacent to the neck ring in a manner later to be described. The blank mold 122 is provided with an undercut or recess 123 (Fig. 4) beveled at its edges as shown for the purpose of locking the neck ring halves together during the blank forming or pressing operation. The neck ring supporting members 120' have rigidly but adjustably secured to their upper portions shoes 124 which are adapted to be engaged by lower beveled portion 125 of the press and blow head, also later to be described in detail.

Thus it will be seen that the neck ring halves or sections are positively locked together subsequent to the removal of the blank mold 122 and during the blowing operations. The adjustment of the shoes is for the purpose of permitting the proper initial set up of the machine and compensating for wear of the parts after the machine has been in operation a considerable time.

Referring to the form of the machine shown in Fig. 5, I provide a means for positively opening the neck ring sections when it is desired to discharge a completely formed article therefrom. For this purpose, the shoes 124 are formed with upwardly projecting points 126, which are adapted to be pushed downwardly when it is desired to open the neck ring by an annular cover plate 127 pivoted at 128 to the neck ring shelf 61. The cover plate 127 is normally held at its upper position by a compression spring 129 extending between the shelf and a foot portion 130 on the cover plate. For depressing the cover plate 127, I provide a bell crank lever 131 pivoted to the neck ring shelf 61 at 132 and provided with a lug 133 contacting with the upper portion of the foot portion 130. For oscillating the lever 131 to depress the cover plate 127, and hence rotating the neck ring supporting members 120' about their pivots to open the neck rings, I provide a latch member 134 pivoted to the press and blow head operating cylinder 135 at 136. A spring 137 extends between one arm of the lever 134 and a suitable anchorage 138 on the cylinder 135 and tends to rotate the arm 134 in a counterclockwise direction about its pivot 136. This motion is stopped, however, by a suitable pin 139 secured in the cylinder 135. The other arm of the lever 134 is adapted to engage a cam portion of an upstanding arm of the bell crank 131 to move it to depress the cover plate 127 upon the upward movement of the cylinder 135. The upwardly extending arm of the lever 131 is provided with a flat portion 140 against which the actuating arm of the latch 134 bears in the position of the part as shown in Fig. 5. It will be seen, however, that after a predetermined upward movement of the cylinder 135, the actuating arm of the lever 134 will engage an inclined cam face 141 of the lever 131 and rotate it in a counterclockwise direction to open the neck ring through the linkage, above described. Upon downward movement of the cylinder 135, the latch 134 will have no action upon the lever 131 due to the latching action thereof extending the spring 137.

If desired, however, it is obvious that the lever 131 could be rotated to depress the cover plate and open the neck ring by means of a suitable cam mechanism subject to a cam on one or the other of the cam drums 7 or 12.

*Neck ring cooling means (Figs. 3 and 5).*

For the purpose of cooling the operating parts, particularly the neck rings which are almost continuously in contact with hot glass, I provide a distributing system for cooling wind, in which the wind is conducted to the machine through a suitable conduit indicated at 142 (Fig. 3) to the bottom of the central hollow column 5, the conduit being attached thereto by suitable connections indicated generally at 143. Adjacent to its top, the column 5 is provided with a plurality of apertures 144 through which the wind may pass into an annular channel 145 formed in the hub of spider 30 and thence through the hollow arms of the spider to the several units. Referring now to Fig. 5, the wind in the several units is conducted through registering apertures in plates 29 and brackets 64 and thence downwardly through the flexible tubes or pipes 146, only the upper and lower sections of which are shown in this figure, the wind passing to a hollow chamber within the neck ring shelf 61 or to a channel formed by this shelf and a lower covering plate 147. From this channel, the wind is conducted to an annular passage or chamber 148 formed by the neck ring shelf 61 and an annular deflecting member 149 which directs the wind onto the neck ring and the parts where cooling is desired. The cover plate 127 cooperates with the parts of the neck ring shelf above described to constrict the flow of cooling wind to the portions of the machine where it is most needed. In the form of the invention shown in Fig. 4, I may provide a cover 150 which prevents the ingress to the moving parts of dirt and other foreign material. The cover plate 127 also serves the purpose of preventing the ingress of foreign materials or dirt into the neck ring and its operating parts.

*Blank mold and its associated operating mechanism*

Referring to Figs. 4 and 5, the blank mold 122 is shown as of the general type illustrated and described in my prior Patent 1,625,590, issued April 19, 1927, and comprises a metallic shell 151 in which is received a suitably shaped mold member 152 of brush carbon or some other suitable composition, this composition forming no part of the present invention. This mold is mounted in the outer end of an arm 153 which is secured to a blank mold operating cylinder 154 as by bolts 155. I preferably provide means for effecting a vertical adjustment of the arm 153 with respect to the cylinder 154, which may comprise a lug 156 formed on the cylinder 154 and provided with a suitable set screw 157 bearing against a portion of the arm 153, there being a suitable jam nut on the set screw for retaining it in the desired adjusted position. It is to be understood that the bolts 155 pass through enlarged apertures in the arm 153 to permit of the adjustment above described.

Figure 19:
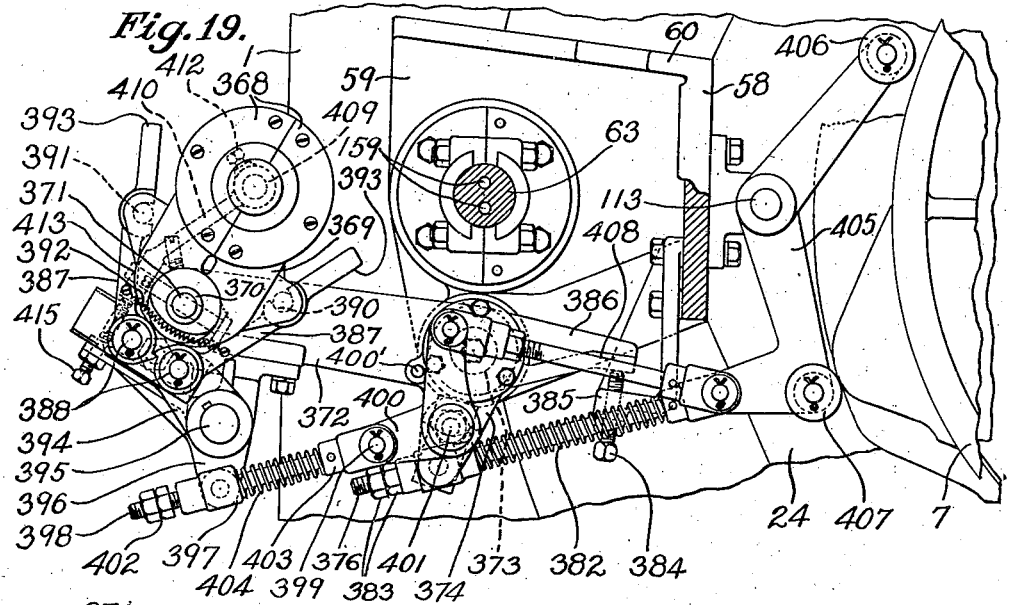
Fig. 19 is a plan view with parts broken away and in section, showing the means for mounting and operating the final blow mold.

The vertical shaft 63 is provided with a fixed piston 158 disposed substantially midway of its length and received in the cylinder 154, so that upon the admission of pneumatic pressure above or below the piston, the cylinder will be moved upwardly or downwardly respectively. The shaft 63 is provided, as shown in Fig. 19, with longitudinally extending bores 159 which terminate in lateral passages 160 and 161 (Fig. 4) respectively above and below the piston 158 for the admission of fluid pressure as above described. The lower end of the bores 159 are connected by laterally extending ducts, one of which is shown in Fig. 4 at 162, with a controlling valve shown in detail in Fig. 15 at 163, the valve being of the double piston type and having five ports in the same way as the valve shown directly above it which is provided for controlling the pressure to the press and blow head operating cylinder 135 in a manner later to be described. Pneumatic pressure is supplied from the annular pipe 21, seen in Fig. 3, to the center opening of the valve. The second and fourth openings are connected respectively to the two bores 159 in the vertical rod 63 and the outer openings of the valve are for exhaust. In one terminal position of the double piston valve member 164, one of the ports 160 or 161 will be connected to exhaust and the other to pressure and in the other terminal position, the reverse will take place, thus controlling the movements of the cylinder 154. For controlling the valve member 164, I provide rocker member 165 pivoted upon the vertical fixed shaft 166 which is secured to the portion 58 of the unit frame by brackets 167 and 168. The member 165 is provided with a pair of arms at the ends of which are mounted rollers 169 and 170 which cooperate with suitable cams on the upper drum 12. The member 165 is connected through a link 171 with the outer end of the stem of valve 164. Thus it will be seen that the admission and exhaust of pressure on both sides of the piston 158 in cylinder 154 is directly controlled by the rotation of the turret.

For the purpose of moving the blank mold to one side after it has had a predetermined vertical downward movement away from the neck ring 121, I provide a cam member 172 (Figs. 3, 4 and 6) having a cam groove therein in which is received a suitable roller or pin 173 mounted in a support 174 secured to the portion 58 of the unit frame.

*Press and blow plunger and associated mechanism*
*Construction of plunger mechanism (Fig. 4)*

One of the main elements of my machine is the combined press and blow head which is somewhat similar to that shown in my copending application, Serial No. 31,315, above referred to, but which includes certain features of difference. This head is indicated generally at 175 and comprises a sleeve member 176 swivelly mounted in an annular ring portion of an arm 177, which is secured to the cylinder 135 as by bolts 178, the member 176 having an upwardly facing shoulder 179 (Fig. 4) spaced a short distance from the lower portion of the annular ring portion of the arm 177. The sleeve member 176 is also provided with another shoulder 180 on which is received an annular bearing member or raceway 181 for ball or roller bearings 182 above which is a raceway 183 received in a cup shaped member 184 secured to the annular ring portion of the arm 177. The upper end of the sleeve member 176 is threaded as at 185 to receive an adjustable annular knurled ring 186 which takes up the downward thrust of the head 175 on the arm 177. This knurled ring 186 is split and the ends are secured together to lock it in adjusted position by a suitable tightening bolt 187. Thus it will be seen that the sleeve member 176 and the head built up therein is rotatable with respect to the arm 177 about a vertical axis, the thrust in both directions is taken up, and the vertical upward thrust due to the pressing is specifically provided for by the use of roller or ball bearings, thus permitting the rotation or oscillation of the head as a whole with the neck ring whenever the latter is rotated.

The lower portion of the sleeve member 176 is beveled, as at 125, for the reason above set forth of locking the neck ring when the head is lowered.

Inside the sleeve 176 is a composite member made up of an upper sleeve portion 188 internally threaded at its lower end to receive the upper externally threaded end of a lower sleeve portion 189, these members being positively positioned by a shoulder 190 formed on the upper sleeve portion and contacting with the upper end of the sleeve member 176, and by a bushing 191 threaded onto the lower sleeve portion 189 and having an upwardly directed shoulder bearing against a downwardly directed shoulder inside the sleeve portion 176. Extending inside and axially of the upper and lower sleeve portions 188 and 189, is the stem 192 of a pressing plunger 193, the lower or plunger portion of which is received or slides in a barrel or extension 194 formed on the lower sleeve portion 189. Referring to Fig. 5, I may if desired make the plunger 193 hollow and provide axially of the stem 192 an inlet duct 195 for some cooling fluid such as air or steam, the duct being somewhat smaller than the bore through the stem 192, so that the cooling fluid may pass in one direction through the duct to the hollow portion inside the plunger 193 and in the other direction through the annular space between the duct and the stem 192. Surrounding the barrel portion 194, I preferably mount a stripper ring 196, which is provided with an inwardly turned shoulder 197 above the barrel portion 194 and which is urged downwardly by a suitable compression spring 198 extending between the inwardly turned shoulder 197 and the bushing 191. This stripper ring is thus resiliently mounted and serves to accommodate any slight excess in the amount of glass supplied to the blank mold. After the neck ring 121 is opened and the head 175 is being raised, the stripper ring 196 serves to push the formed article off the head. The mechanism for effecting this operation will be hereinafter described.

*Vertical and lateral movements of the press and blow head*

Figure 14:
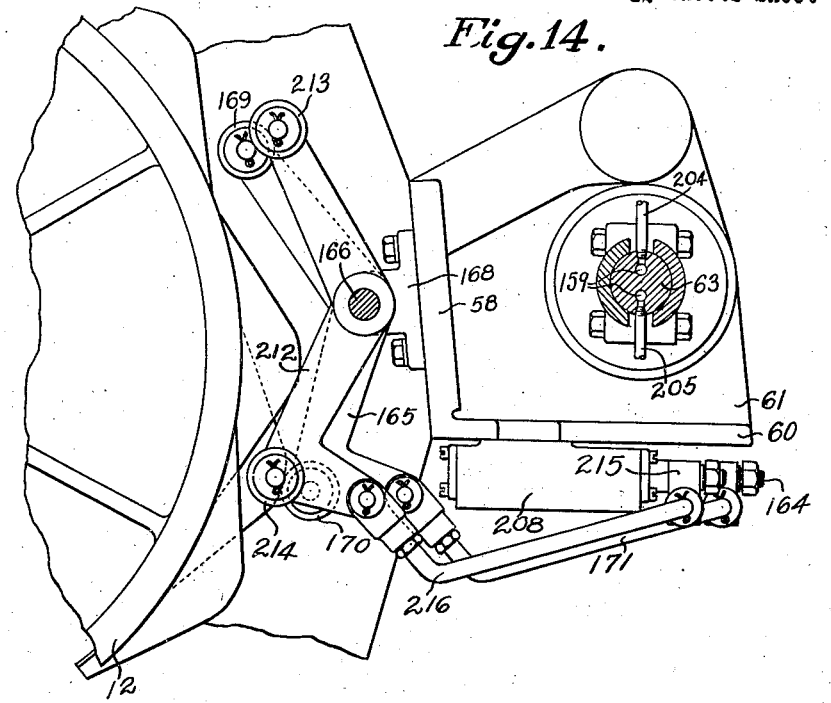
Fig. 14 is a plan view with certain parts omitted for clearness and the others in section, showing the means for operating the valves for the press and blow head and blank mold cylinders respectively.
Figure 15:
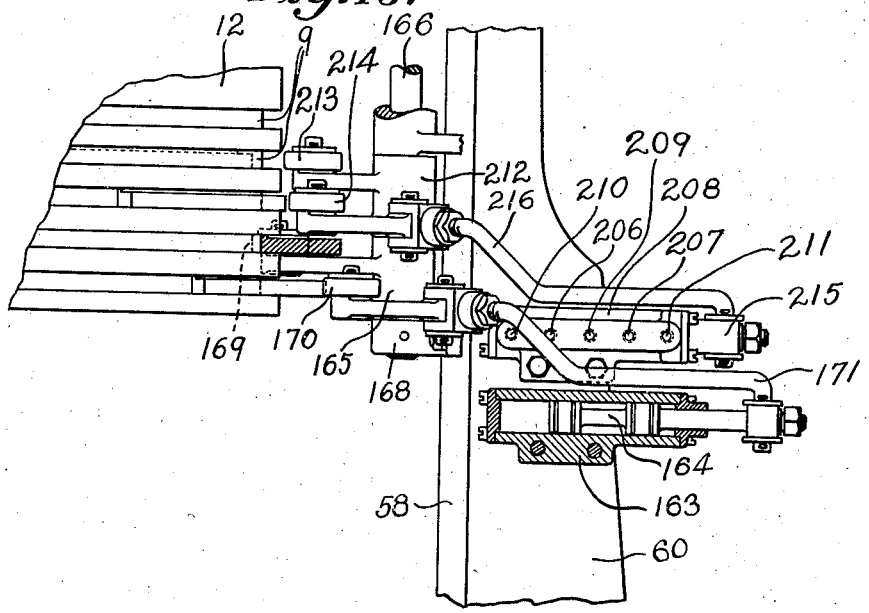
Fig. 15 is an elevation, partly in vertical section showing the construction of the parts shown in Fig. 14.

I provide a means for moving the press and blow head 175 vertically and laterally which, in this instance, comprises means similar to that used for moving the blank mold 122 vertically and laterally. As previously stated, the press and blow head 175 is mounted on the arm 177, which is in turn secured to the cylinder 135. The vertical shaft 65 is provided with a fixed piston 199 disposed substantially midway between the bracket 64 and the neck ring shelf 61, the piston 199 being received in the cylinder 135. Means similar to that used with the lower cylinder 154 are here employed for supplying pneumatic pressure above and below the piston 199 within the cylinder, such means comprising longitudinal bores 200 and 201 (Fig. 9) communicating above and below the piston 199 respectively through lateral bores 202 and 203 (Fig. 4) and communicating through pipes 204 and 205 (Fig. 9) with ports 206 and 207 respectively to the valve 208 (Fig. 15). Pneumatic pressure is supplied to the central port 209 of this valve, the end ports 210 and 211 being open to exhaust in the manner described above in connection with the valve 163. The valve 208 is controled by a rocker member 212 (Figs. 14 and 15) pivotally mounted upon the rocker shaft 166 and provided with suitable rollers 213 and 214 for cooperation with a pair of cams on the upper cam drum 12. This rocker 212 is connected with the valve stem 215 through a link 216 in a manner similar to that described above in connection with the other valve. Thus it will be seen that the vertical movements of the press and blow head are controlled entirely by the rotation of the turret. For moving the press and blow head laterally, I provide on the cylinder 135, a suitable cam member 217 (Figs. 3, 4 and 5) provided with a suitably shaped cam track in which is received a pin or roller 218 mounted on a support 219 which is in turn secured to the portion 58 of the unit frame.

Starting with the press and blow head in its lower position as shown in Figs. 4 and 5, the first upward movement of the head 175 will be vertical, which will be followed after a predetermined movement, by a lateral movement in a substantially clockwise direction viewed from the top. The lateral movement of the press and blow head 175 to its upper inoperative position permits the introduction of a charge of glass directly downwardly into the mold which may be effected by any suitable means operable while the turret as a whole is in motion.

*Interlocking safety devices between the press and blow head and the blank mold (Figs. 6, 7 and 8)*

For the purpose of insuring the sequence of operations outlined generally above, I have provided certain interlocking safety devices which are adapted positively to prevent the movement of certain parts of the apparatus in an order other than that desired.

The first of these devices to be considered is that to prevent the lowering of the press and blow head while the blank mold is in its lower position after the blowing of an article and prior to the time the blank mold is raised for the reception of a new charge of glass. Such an action might occur in the event of a sudden cut-off of the pneumatic pressure to the machine as a whole between the time the plunger has risen, discharging a finished article and the introduction of a new charge. For this purpose, I provide an interlocking safety device comprising a bell crank lever 220 (Figs. 6 and 7) pivoted to a suitable bracket 221 secured to the portion 60 of the unit frame and having one arm connected with an L-shaped actuating member 222, which extends through the neck ring shelf 61 and is urged downwardly by a compression spring 223. A suitable stop collar 224 is provided on the member 222 for limiting its downward movement under the action of the spring 223. When the blank mold cylinder 154 is in its lower position, the spring 223 will move the member 222 downwardly swinging the lever 220 in a clockwise direction, as seen in Fig. 7, to the dotted line position there indicated, where it will be in the path of the press and blow head moving cylinder 135, and thus will prevent the lowering of the head 175 during the time the blank mold 122 is in its lower position. Upon raising of the blank mold to the position shown in Figs. 6 and 7, the upper part of the cylinder 154 will contact with and push upwardly the member 222, thus rocking the lever 220 in a counterclockwise direction about its pivot and moving it out of the path of the cylinder 135, thereby permitting the latter to be lowered for the purpose of pressing and otherwise working the glass charge. Also subsequent to the pressing operation, when the blow mold is lowered, the lever 220 cannot interfere with the operation of the head and member 175 as the long arm of the lever will merely rest against the side of the cylinder 135.

Figure 8:
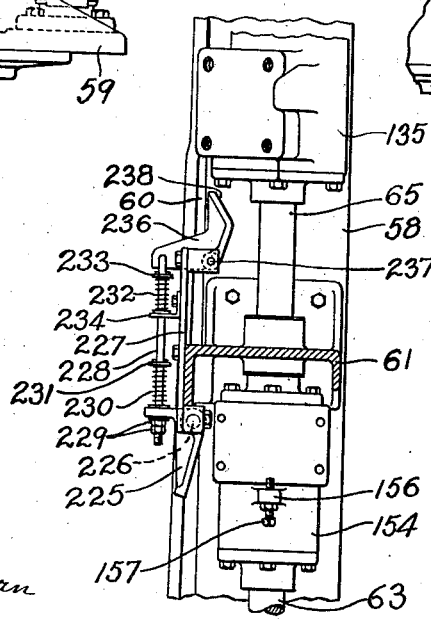

A second safety device is used for the purpose of positively preventing the raising of the blank mold subsequent to its lowering at the completion of the pressing operation and prior to the raising of the head 175 at the completion of an article forming cycle. In this way, it is possible positively to prevent the contacting of the blank mold with the blow mold, the burner, the necking tool and mechanism or a parison after it has begun to elongate. I have shown a means for effecting this purpose in Figs. 6 and 8, which comprises a bell crank lever 225 pivoted at 226 to a suitable bracket 227 secured to the neck ring shelf 61. Extending through one arm of the lever 225 is a rod 228 which is not positively secured to the lever 225, but is provided with a pair of adjustable lock nuts 229 disposed on the rod beneath the arm of the lever 225 and a compression spring 230 extending between the upper side of the arm of lever 225 and a suitable abutment 231 secured to the rod 228. Thus it will be seen that upon upward movement of the rod 228, the lever 225 will be positively rocked in a clockwise direction, whereas on lowering the rod 228, the spring 230 will be compressed and the lever 225 will not be rotated in a counter-clockwise direction until such action is permitted by the lowering of the blank mold cylinder 154, at which time the lever 225 will move into a position in the path of the cylinder 154 to prevent its upward movement until the lever 225 is again moved out of the said path. The rod 228 is urged toward its upper position by a compression spring 232 extending between an abutment 233 secured to the rod 228 and a stationary bracket 234 secured to the bracket 227. The other end of the rod 228 is bent at substantially right angles, as shown at 235 (Fig. 6), and is received in one arm of a bell crank lever 236 which is pivoted at 237 to a bracket on the upper end of the bracket 227. The bell crank lever 236 is so shaped and disposed as to be in the path of movement of the press and blow head cylinder 135, so that when the cylinder 135 is moved from its raised position as shown in Fig. 8 downwardly, it will contact with the inclined face 238 of one arm of the lever 236 and move it in a counterclockwise direction positively depressing the rod 228 against the compression of spring 232 and tending to move the lever 225 into the path of the blank mold cylinder 154 as previously described. When the blank mold cylinder is moved downwardly at the termination of the pressing operation, the lever 225 will be moved by the spring 230 into the path of its upward movement and will positively prevent its being raised, as by an accidental supplying of pressure above the piston 158 prior to the upward movement of the cylinder 135 at the termination of an article forming cycle. This upward movement will permit the spring 232 to raise the rod 228 and move the lever 225 out of the path of the cylinder 154.

Thus it will be seen that I have provided safety devices insuring the joint operation of the press and blow head and the blank mold in the desired order.

Actuation of the pressing plunger within the head valve (Figs. 4, 5 and 9)

Returning now to the press and blow head 175, I provide means for moving the pressing plunger 193 to its pressing position as shown in Figs. 4 and 5 and to a retracted position for permitting the blowing of the glass. For this purpose, the plunger stem 192 is provided with a collar 239 secured thereto within the upper sleeve member 188 and extending between this collar and the top of the lower sleeve member 189 is a compression spring 240 for moving the plunger 193 upwardly within the barrel 194.

For the purpose of controlling the position of the plunger 193 within the barrel, I provide a means including a cam member 241 (Fig. 4) cooperable with the upper end of the plunger stem 192. In the form of the invention shown in Figs. 5 and 9, wherein there is a duct 195 passing down through the center of the plunger stem for the purpose of supplying cooling fluid to the plunger, a bifurcated cam member 241' is used, which has the same function as the cam 241. The cam member 241 or 241' is mounted substantially centrally of a U-shaped yoke 242 which is pivoted at either side of the annular portion of arm 177 at 243. A bell crank lever 244 (Fig. 4) is pivoted to the cylinder 135 at 245 and has one arm connected to the yoke 242 by a link 246. Through this means, the cam 241 is swung to a position, as shown in Fig. 4, to depress the plunger or to a position to the left of that shown to permit the spring 240 to raise the plunger by means actuating the bell crank 244.

For the purpose of tripping the plunger or permitting it to be raised by the spring, I have shown two forms of my invention, one in Fig. 4 and the other in Fig. 5, the latter being the preferred form.

Referring first to the form of the invention shown in Fig. 4, a vertical rod 246' is mounted for longitudinal sliding movement in brackets 247 and 248 secured to the portion 58 of the unit frame and the neck ring shelf 61, respectively, the upper end of the rod contacting with one arm 249 of the bell crank 244. For the purpose of moving the arm 249 upwardly to trip the cam 241, I provide a bell crank 250 pivoted at 251 to a bracket 252 depending from the neck ring shelf 61. One arm of the bell crank 250 is adapted to abut against the lower end of the rod 246' and the other is cam shaped and adapted to be engaged by a stop or pin 253 on the blank mold cylinder 154. Thus when the blank mold cylinder is lowered, the pin 253 will rotate the bell crank 250 in a counterclockwise direction, moving the rod 246 upwardly and thereby moving the bell crank 244 in a counterclockwise direction, which acts through the link 246 to move the yoke 242 to the left, as seen in Fig. 4, about its pivots 243, thus moving the cam 241 out of alignment with the upper end of the shaft 192 and permitting the spring 240 to raise the plunger 193.

Referring now to Figs. 5 and 9, in which is shown the preferred form of the tripping mechanism, the lever 244' corresponds to but is shaped somewhat differently from the lever 244, this lever being connected in a similar manner through the link 246 with the yoke 242. Here however, instead of providing a means interlocking with the blank mold cylinder 154, I prefer to operate the tripping mechanism directly in response to the rotation of the turret. For this purpose I provide a rocker arm 254 pivoted on the rocker shaft 166 and having a rocker 255 mounted on one end thereof for engagement with a suitably shaped cam on the upper cam drum 12. The rocker arm 254 has a portion 256 abutting a pin 257 which is mounted in a suitable bearing 258 secured to the portion 58 of the unit frame, the pin 257 abutting against a suitable projection 259 of the lever 244. A spring 260 extends between the bearing 258 and abutment 261 on the pin 257 and serves to hold the roller 255 in engagement with its operating cam. The advantage of this construction is that the raising of the pressing plunger 193 is entirely independent of the movement of the blank mold, and it may be raised at any predetermined selected time with respect to the cycle of the machine, either before, at or after the lowering of the blank mold. In practice, this action takes place slightly before the lowering of the blank mold.

For the purpose of lowering the pressing plunger to its pressing position at the termination of an article forming cycle and preparatory to pressing the succeeding charge of glass to form the succeeding article, I provide a fixed cam member 262 secured to the upper bracket 64 of the unit and cooperable with the upper end 263 of the lever 244 or 244' as the case may be. Thus when the press and blow head 175 is raised and rotated laterally due to the upward motion of the cylinder 135 as explained above, the end 263 of the lever 244 or 244' will contact with the fixed cam 262 rotating the lever in a clockwise direction and rotating the yoke 242 in a clockwise direction about its pivots 243 through the link 246, thus lowering the pressing plunger 193 through the engagement of the cam 241 or 241' with the upper end of the plunger stem 192.

Actuation of stripper ring to remove finished ware (Figs. 4, 5 and 9)

As previously described, the stripper ring 196 is urged downwardly by a spring 198, but I prefer in addition to this spring to provide a positive means for moving the stripper ring downwardly to strip a formed glass article from the press and blow head after the completion of an article forming cycle. This means comprises one or more rods 264, two of which are shown, contacting at their lower ends with the upwardly facing shoulder 197 of the stripper ring 196 and extending longitudinally through the head 175. These rods are secured together at their upper ends by an annular ring 265 for insuring their simultaneous movement. A pair of cranks 266 are fixedly mounted upon a shaft 267 journaled in the upper end of the arm 177 and bear against the annular ring 265. A third arm is secured to the shaft 267 and is connected through an adjustable link 268 with one arm of the lever 269 pivoted at 245 on the cylinder 135 and provided at its other end with a roller 270 which is adapted to engage a fixed cam 271 secured to the portion 58 of the unit frame a short distance above the position of the roller 270 when the press and blow head 175 is in its lower or operative position, as shown in Figs. 4 and 5.

As the head 175 is moved upwardly by the cylinder 135 at the termination of an article forming cycle, no action will take place until the roller 270 contacts with the cam 271, at which time the lever 269 will be rotated about its pivot 245 in a clockwise direction and will rotate the cranks 266 about their pivot 267 in a counterclockwise direction through the link 268, which will be effective to depress the ring 265 and thus force the stripper ring positively downward by means of the rods 264, and effect a positive stripping of the finished article from the press and blow head 175.

Air supplying mechanism for puff blowing the parison and final blowing the article I provide means for supplying air through the press and blow head 175 to the inside of the neck ring for blowing the parison, the same passages being used for both the puff and final blow. Air is supplied to the head 175 through a pipe 272 (Figs. 4 and 5) leading to an annular passage 273 inside the annular portion of the supporting arm 177. Referring now to Fig. 4, the sleeve member 176 is provided with an aperture 274 opposite the annular groove 273 and extending to the annular space between said member and the upper sleeve member 188. The upper sleeve member is provided with one or more suitable apertures 275 permitting the passage of air to the annular space between this member and the plunger stem 192, this space extending inside the annular lower sleeve member 189 to the space within the barrel member 194 and above the plunger 193. The barrel member is provided with one or more longitudinally extending grooves 276 terminating a short distance above its lower end and adapted to be opened to the inside of the neck ring by the retraction of the plunger 193. Thus air supplied to the pipe 272 will be conducted to the inside of the neck ring when the plunger 193 is retracted or in its upper position at all times and irrespective of the rotation or oscillation of the neck ring and press and blow head.

Figure 16:
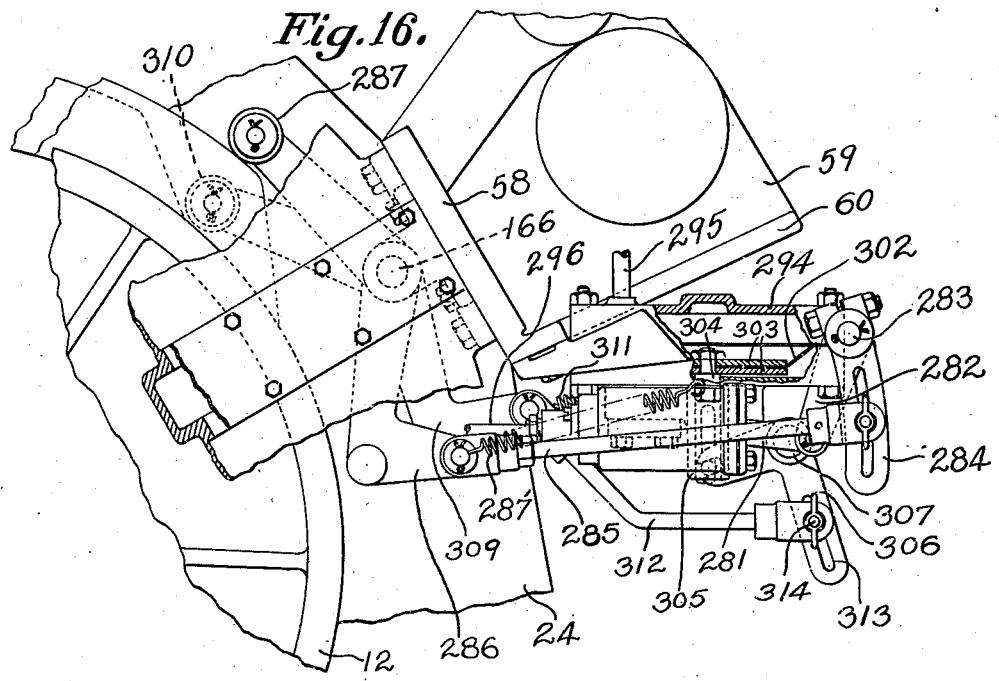
Fig. 16 is a plan view with parts omitted and others broken away and in section showing one form of air suplying means for blowing the articles.
Figure 17:
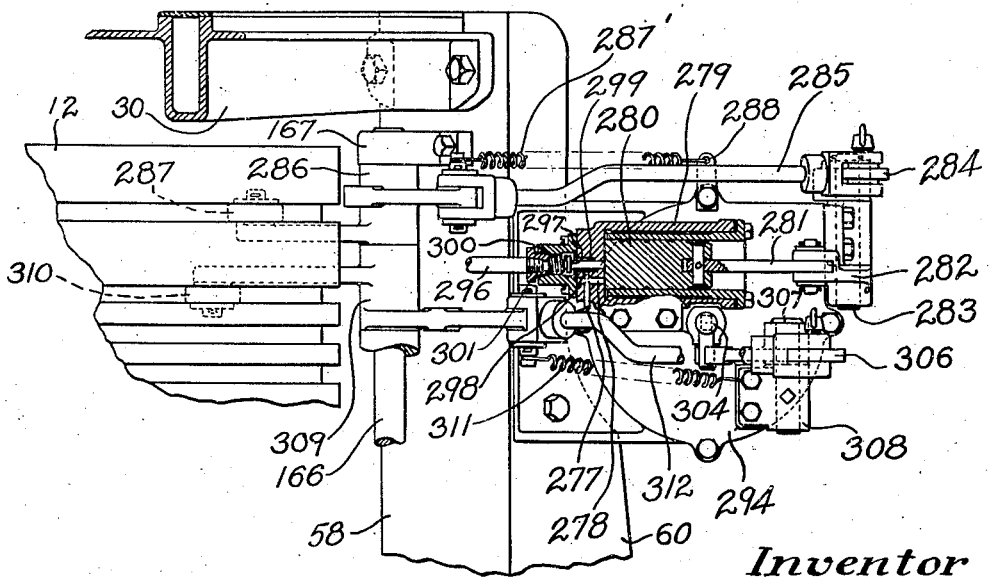
Fig. 17 is an elevational view with parts broken away and in section showing the parts illustrated in Fig. 16.

Referring now to Figs. 16 and 17 showing one form of the puff blowing mechanism and to Figs. 9 and 18 showing another and preferred form of this mechanism, I provide means for supplying a controllable puff blow to the glass article while it is confined by the neck ring and during the reheating and necking operations, this means in both forms of the invention embodying a cylinder and piston arrangement for forcing air to the parison, the piston being operated directly by a cam on the upper drum 12.

Referring first to Figs. 16 and 17, a pipe 277 is shown which leads in a manner not shown to the pipe 272, so that pressure supplied to the pipe 277 will be transmitted to the parison in the maner above described. The pipe 277 communicates with a passage 278 in the head of puff blow cylinder 279, which passage communicates with the inside of the cylinder head. The piston 280 in this cylinder is linked by a connecting rod 281 with a crank arm 282 secured to a vertical rock shaft 283 journaled in a suitable bearing rigid with the frame of the unit. A second crank arm 284 is secured to the upper end of the rock shaft 283 and is connected by a link 285 with one arm of a rocker member 286 loosely journaled upon the shaft 166. Another arm of the rocker member 286 is provided with a suitable roller 287 which cooperates with a suitably shaped cam mounted on the upper cam drum 12. A spring 287' extends between a suitable point on the rocker 286 and a fixed anchorage 288 on the machine and tends to hold the roller 287 in engagement with its cam. The pivotal connection between the link 285 and the crank 284 is adjustable toward and away from the rock shaft 283 to vary the throw of the crank and thus vary the length of stroke of the piston 280 within its cylinder 279 for controlling the amount of puff blowing air supplied to the parison.

Referring now to Figs. 9 and 18, corresponding parts of the puff blowing system have been given corresponding numbers as far as possible, the difference being that the adjustment of the pivotal connection between the link 285 and the crank 284 is made somewhat more accurate by the use of a screw 289 swively mounted in a bracket 290, which is in turn swively mounted adjacent to the outer end of the link 284 and threaded into a collar 291 swively mounted on the end of the link 285. Also the outer position of the piston 280 in the cylinder 279 may be positively adjusted by means of a stop screw 292 threaded through a suitable bracket 293 secured to the bearings for the rock shaft 283, thus effecting a double control on the piston movements for controlling the puff blow.

I also provide means for supplying final blowing air to the parison when in the final blow mold for blowing it to the shape of the mold. For this purpose, I have shown two forms in which the final blowing mechanism may be made, one in Figs. 16 and 17 and a second, and the preferred form, in Figs. 9 and 18.

Referring first to Figs. 16 and 17, in which one form of apparatus is shown for supplying final blowing air to the press and blow head 175, the air is supplied through the pipe 277 to the pipe 272 and through the several passages above described to the neck ring. The air for the final blowing is expelled from the inside of a chamber 294 through the pipe 295 (Fig. 16) and through a connection (not shown) to the pipe 296 (Fig. 17), thence past the valve 297 which is shown opened, passage 298 and the pipe 277. The valve 297 is provided with a stem 299 against which the piston 280 abuts at the extreme end of its stroke to open the valve against the pressure exerted by a spring 300 extending between the head of the valve and the end of the bushing 301 in which the pipe 296 is threaded. The cam with which roller 287 contacts is so shaped as to cause a movement of the piston 280 almost to the end of its stroke for supplying puff blowing air to the parison and then subsequent to the enclosing of the parison within the blow mold, to the extreme end of its stroke, to open the valve 297 and permit the passage of final blowing air to the parison. For forcing the air out of the chamber 294, I prefer to use a combined piston and diaphragm arrangement, comprising a flexible diaphragm 302 (Fig. 16), the center portion of which is enclosed between rigid members 303 which are connected to and actuated by a plunger member 304 slidably mounted in a suitable bearing 305. I provide means for operating the plunger 304, comprising a bell crank 306 pivoted at 307 to a suitable bracket 308 which is secured to one wall of the diaphragm chamber 294. For operating the bell crank, I employ a rocker member 309 pivotally mounted on the shaft 166 and having a roll 310 mounted on one arm thereof and cooperable with a suitably shaped cam on the upper drum 12. A spring 311 similar to the spring 287' is employed for retaining the roller 310 in engagement with its actuating cam. I provide means for varying the stroke of the plunger 304 and thus for varying the amount of air supplied for final blowing the parison by the diaphragm pump, comprising an adjustable connection between the link 312 which connects the rocker 309 with the bell crank 306 and the arm of the crank to which the link 312 is connected. This adjustable connection is effected by providing in the actuating arm of the lever 306 an elongate opening 313 along which the pivotal connection 314 of the link 312 may be adjusted.

The advantage of using pump mechanisms, such as the puff blow cylinder and the diaphragm, is that the air which is subsequently used for blowing the article must be drawn into the cylinder by a retraction of the several pistons or plungers through the press and blow head 175, the operative lower end of which is heated to a relatively high temperature, so that the air thus drawn in is quite hot and the irregularities in the operation of the machine due to using cool air for blowing the article are to a large extent obviated. This is especially true in the puff blowing operation, so that in the preferred form shown in Figs. 5, 9 and 18, the puff blowing is still done by a piston device which pulls the air in during the raising of the press and blow head 175, and thus stores up preheated air for the use in puff blowing the parison.

Referring now to Figs. 5, 9 and 18, I show a means for admitting final blowing air to the pipe 277 from a source of compressed air (not shown), this air usually being taken from the air pressure system of the glass factory. Preferably, this air is supplied at a relatively low pressure to the units from the distributing pipe 21, if desired, through some suitable pressure reducing device (not shown) the low pressure air being conducted to the unit through pipe 315 (Fig. 18), where it is controlled by a valve 316 of novel design. The valve is mounted upon a valve stem 317 received in an extension 318 of the left hand end of the cylinder 279 as seen in Fig. 18. The valve is urged toward a closed position by a suitable compression spring 319 extending between the head of cylinder 279 and the head of the valve. I provide a means for opening this valve at the desired time comprising a rocker member 320 pivotally mounted upon the shaft 166 and provided with a roller 321 adapted to cooperate with a suitably shaped cam on the upper drum 12. An adjustable striker member 322 may be provided in connection with the rocker member 320 to regulate the operation of the valve 316. A longitudinal bore 323 is formed as shown in the left hand end of the valve stem 317 and is provided with a lateral opening at its inner end which in the closed position of the valve is closed and inoperative (Fig. 18). When the roller 321 rides onto the first step of its cooperating cam, it will move the valve stem 317 a sufficient amount to permit the passage of pressure air from the pipe 315 through the valve chamber, the passage 278 and pipe 277 to the blow head as above described. When the final blowing of the article has been completed, it is desirable to vent the inside of the parison and cut off the supply of final blowing air, and for this purpose the roller 321 rides on a second stepped portion of its cooperating cam and is effective to push the valve stem 317 inwardly a further distance, whereby to open the lateral passage communicating with the bore 323 to the inside of the valve chamber. Inasmuch as these venting passages are larger in diameter than is the pipe 315 and as the pressure admitted through that pipe is relatively low, the pressure will be vented completely through the passage and bore 323 and the inside of the parison will be thereby vented, thus permitting the opening of the blow mold without the danger of deformation of the parison due to the expansion of the trapped air therein. The valve 316 may be closed at any desired time by the spring 319 subject to the operating cam, but preferably after the blown article has been stripped from the blow head, this spring serving also to retain the roller 321 against its cooperating cam whenever this action is necessary.

Mounting and operation of the reheating burner

Figure 12:
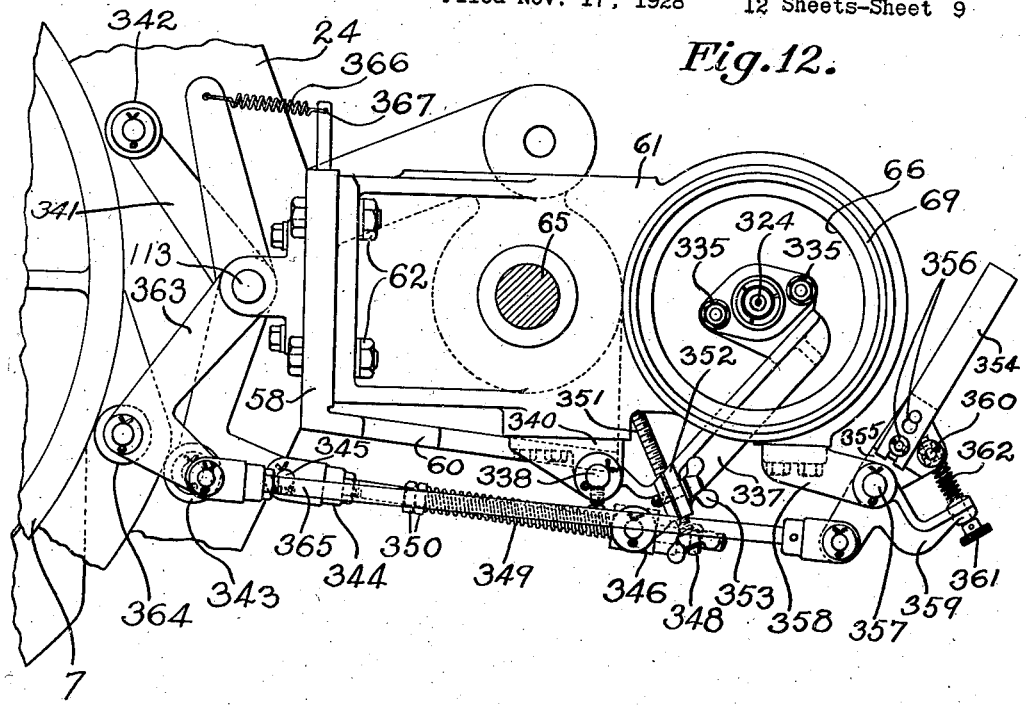
Fig. 12 is a plan view partly in section showing the neck ring support and necking tool and the burner mounting, with parts omitted for clearness of illustration.

Referring now to Figs. 12 and 13, I show a burner for the purpose of reheating and controlling the shape of the parison during its unconfined elongation. During this time, the parison is preferably rotated or oscillated as desired and is supplied with puff blowing air in the above described manner for the purpose of causing it to elongate, this effect being assisted by the action of gravity. I have shown for the purpose of reheating the parison during the elongation and/or controlling the shape of the parison, a burner 324 which may be supplied with compressed air or a combustible mixture or both through a flexible tube 325 from a gas pipe 326 and an air pipe 327 controlled by valves 328 and 329 respectively. Thus the burner 324 may be used as a burner or as a nozzle for a jet of compressed air by the control of valves 328 and 329. The burner 324 is provided with a ball shaped portion 330 which is received in a suitable rigid support 331 and a coacting resiliently mounted support 332, the latter being urged toward the support 331 by compression springs 333 surrounding the rods 334 and suitably compressed by nuts 335 threaded upon the rods.

Thus I have a universally mounted burner permitting it to direct a flame or a jet of compressed air, as desired, against the parison during the elongation thereof and thus to control the shape and elongation of the parison. The support 331 is secured to a depending portion 336 of an arm 337 pivoted on a vertical shaft 338, which in turn is secured as by a set screw 339 in a bracket 340 suitably fastened to the neck ring shelf 61. I provide means for swinging the arm 337 about its axis 338 comprising a rocker member 341 pivoted upon the rocker shaft 113 and provided with a pair of arms having rollers 342 and 343 at their ends respectively. The rocker member 341 is connected to the arm 337 by a link 344 which is connected by a vertical pivot 345 to the rocker member 341 and extends through a swivelly mounted bracket 346 on the arm 337. The link 344 is provided with a pair of lock nuts 348 adjacent to its outer end on one side of the bracket 346 and with a compression spring 349 extending between the other side of the bracket 346 and a second pair of lock nuts 350 constituting an adjustable abutment. Thus the rocker member 341 may be positively controlled in its movement by coaction with a pair of complementary cams on the lower drum 7 and is effective positively to withdraw the burner from its operative position whenever such action is desired, and to move it resiliently into its operative position due to the compression of the spring 349. I also provide an adjustable means for limiting the movement of the arm 337 in a counterclockwise direction, as seen in Fig. 12, to vary the operative position of the burner 324. This means takes the form of an adjusting screw 351 threaded in a split bracket 352 and adapted to be clamped in adjusted position by a suitable clamping screw 353, the end of the screw 351 abutting against a stop or fixed portion of the apparatus.

Necking tool and movements thereof

For the purpose of constricting the neck of the parison, I employ a necking tool such as that shown at 354 (Figs. 12 and 13) which is removably attached to a supporting bracket 355 by a conventional form of keyhole slot positioning means indicated generally at 356. The purpose of this connection is to permit the replacement of necking tools without stopping the operation of the machine. The bracket 355 is loosely mounted upon a shaft 357 disposed in a bracket 358, which is preferably secured to the neck ring shelf 61. A bell crank 359 is also loosely mounted on the shaft 357 and is provided with an arm through the end of which extends an adjusting screw threaded into a block pivoted at 360 to the bracket 355, said screw terminating in an adjusting knob 361 outside the lever 359. Extending between the arm of the lever 359 receiving the screw and against which the adjusting knob 361 bears and the bracket 355 is a suitable compression spring 362. For moving the lever 359, I provide a rocker member 363 pivoted on the rocker shaft 113 and provided with a roller 364 cooperating with a suitably shaped cam on the lower cam drum 7. The rocker member 363 is connected with the lever 359 by a rigid link 365, and the roller 364 is urged against its cooperating cam by a suitable tension spring 366 extending between one arm of the rocker 363 and a suitable anchorage 367 (Fig. 12).

Thus I have provided a necking device operable in response to the rotation of the turret and timed in accordance with the desired cycle of the machine, and which is movable resiliently toward an operative position in contact with the parison due to the spring 362 and which may be withdrawn from its operative position by the tension of the spring 366.

BLOW MOLD AND ASSOCIATED MECHANISM

*Mounting of the blow mold*

Figure 20:
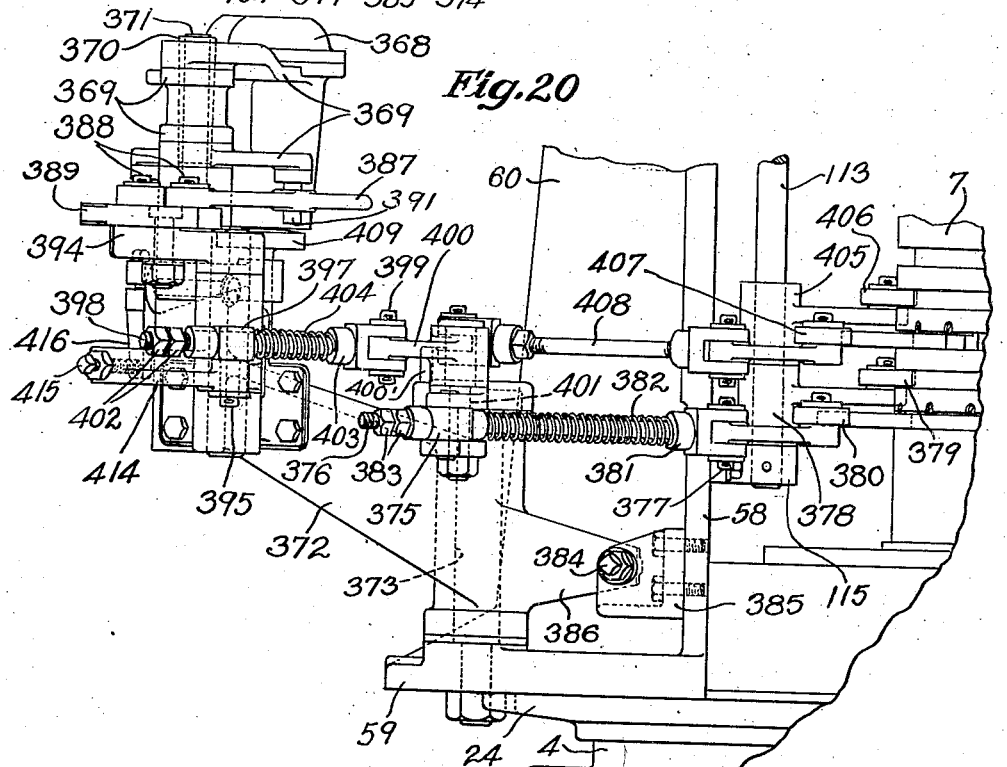
Fig. 20 is an elevation of the parts shown in Fig. 19.

Referring to Figs. 19 and 20, I have shown a blow mold comprising a pair of complementary halves or sections 368 which are provided with arms 369 here shown as integral with the sections and pivoted upon a suitable sleeve member 370, the sleeve and blow mold sections being received as an entirety upon a vertical shaft 371. The purpose of this construction is to permit the halves 368 of the blow mold being removed as a unit for renewing the "paste" coating or to have a different type of blow mold substituted for making a different shape of ware. The vertical shaft 371 is rigidly mounted on the outer end of an arm 372 which is pivoted on a vertical shaft 373 secured in the lower portion 59 of the unit frame. Thus the blow mold may be swung as a unit to and away from an operative position surrounding a parison or final blown article held in the neck ring.

*Means to move blow mold and arm to and from operative position*

For the purpose of moving the blow mold to and from an operative position, a side arm or crank 374 (Figs. 19 and 20) is formed on the arm 372 and receives at its outer end a pivotally mounted bracket 375 through which passes a link 376. The inner end of the link 376 is pivotally mounted at 377 to a rocker member 378 pivotally mounted upon the rocker shaft 113, the rocker 378 being provided with a pair of arms having rollers 379 and 380 at their ends cooperating with suitably shaped complementary cams on the lower drum 7. A suitable abutment 381 is adjustably or rigidly mounted upon the link 376 and extending between this abutment and one side of the bracket 375 is a compression spring 382. On the other side of the bracket 375 a pair of lock nuts 383 are threaded on a link 376 for the purpose of providing an abutment and controlling the compression of the spring 382. An adjustable stop 384 is provided in a bracket 385 secured to the portion 58 of the unit frame for contact with a rearwardly extending arm 386 which may be integral with the arm 372.

From the above description it will be seen that the movements of the rocker member 378 are positively controlled by the cooperation of rollers 379 and 380 with their respective cams, and through the connections described it will be seen that a positive means is provided for withdrawing the blow mold out of its operative position and a resilient means including spring 382 is provided for moving the blow mold toward its operative position, this position being determined by the adjustment of the stop 384.

*Means to open and close blow mold*

Referring again to Figs. 19 and 20, I provide a means for opening and closing the blow mold halves 368 comprising a pair of arms 387 pivoted at 388 to an actuating member 389 and provided with notches 390 engaging pins 391 rigid with the blow mold halves 368. The arms 387 are urged together by a suitable tension spring 392 connected between them at a distance from their pivots 388 and are provided with extensions 393 serving as handles when it is desired to spread the arms to remove them from engagement with the pins 391 and thus permit the substitution of a different blow mold as above described. The actuating member 389 is mounted for pivotal movement or for angular adjustment on a crank 394 secured to the upper end of a shaft 395 to which is also secured a second crank 396 having pivoted thereto a bracket member 397. A rod or link 398 passes loosely through the bracket 397 and is pivoted at its other end at 399 on one arm of a bell crank 400 mounted on a pivot 401 on the arm 374. The outer end of the rod 398 is threaded and is adapted to receive a pair of lock nuts 402 and intermediate an abutment 403 adjustably or rigidly secured to the rod 398 on one hand and the bracket 397 on the other is a suitable compression spring 404.

Thus when the bell crank 400 is moved to the position shown in Fig. 19, the spring 404 will be compressed tending to rotate the crank 396 and shaft 395 in a clockwise direction and moving the pivots 388 toward the shaft 371 and thus effecting a closing of the blow mold, this closing being resilient due to the spring 404. When, however, the bell crank 400 is rotated in a clockwise direction by means hereinafter to be described, the lock nuts 402 will contact with the bracket 397 or a part rigid therewith and will effect a positive opening of the mold halves 368. It is noted that the arm of the bell crank 400 and the rod 398 in the closed position of the mold halves 368, as shown in Fig. 19, form a toggle which will be effective to retain the halves in closed position, even though the bell crank 400 is not positively held against rotative movement. The bell crank 400 contacts with a suitable stop 400' in the closed position of the mold halves 368 as shown.

For moving the bell crank 400 as desired, I employ a rocker member 405 having a pair of arms thereon at the ends of which are mounted rollers 406 and 407 cooperating with a pair of cams on the lower drum 7. This rocker member is connected with a second arm of the bell crank 400 by the pivoted link 408. The cams with which the rollers 406 and 407 cooperate are preferably short and serve merely to give the rocker 405 an initial movement in the desired direction at the desired time and do not retain the rocker member positively against motion between the movements thereof, the retention of the parts in the position to which they are moved being taken care of by the toggle arrangement described above.

Bottom plate for the final blow mold and its actuating means

Referring now to Figs. 1, 19 and 20, I prefer to provide a bottom plate for the blow mold which is movable in a substantially vertical direction with respect to the mold halves 368 for the dual purpose of permitting the use of a bottom plate of convex form for making articles such as concave bottom tumblers and for the use with certain types of ware in which a parison may be made somewhat longer than the blow mold, and it is desired to push up the bottom of it in making the final article. The bottom plate is shown at 409 and is vertically adjustably mounted on the end of an arm 410 by means of a stem 411 passing through the arm and secured thereto in any suitable manner as by a set screw 412. The arm 410 constitutes one arm of a bell crank pivoted at 413 on a horizontal axis passing directly through a point in prolongation of the axis 371 of the blow mold halves 368, the bottom plate 409 being substantially in the horizontal plane of the pivot 413 in the operative position of the parts shown in Fig. 1. For actuating the bell crank to move the bottom plate into its operative position, I provide an arm 414 (Fig. 20) secured to the shaft 395 and having at its outer end an adjustable stop screw or actuating member 415, which is adapted to contact with the other or substantially vertical arm 416 of the bell crank. Thus when the bell crank 400 is moved to rotate the crank 396 to close the blow mold, the arm 414 and striker or stop member 415 will actuate the bell crank including arms 416 and 410 to move the bottom plate 409 to its operative position, this movement being simultaneous with the closing of the blow mold halves.

Takeout mechanism

Referring to Figs. 1 and 2, I have shown one form of takeout mechanism which may be used with this machine, comprising a three armed spider having receptacles at the outer ends of its arms which are adapted to be rotated substantially tangentially of the path of the final blown article, so that during the continuous rotation of the turret, the final blown articles are successively moved to a position above one of these receptacles and when discharged from the neck ring and press and blow head as above described, they will be carried successively by the receptacles away from the main turret of the machine and may then be removed for subsequent operations such as annealing.

The spider which I have indicated at 417 is mounted on a vertical shaft 418 received in a suitable standard 419 mounted on the base 1 and is driven from a worm and worm wheel generally indicated at 420. The worm is secured to a horizontal shaft 421 which is driven through suitable sprocket and chain means 422 from the main drive shaft 40 of the machine.

At the end of each arm of the spider 417 is a bracket 423 having a substantially semi-annular guard 424 mounted thereon and a bottom plate 425 secured to the guard 424 in any suitable manner as by an L-shaped bracket 426. A generally U-shaped push-off member 427 is provided in connection with each of the guards and cooperating bottom plates and is disposed slightly above the bottom plates 425 and, in most positions of the receivers, in alignment with the guards 424. Each push-off member 427 is preferably pivoted on a vertical shaft 428 secured in the bracket 423 and is provided with an actuating arm 429, which is positioned to contact with a fixed detent 430 secured to a sleeve 431 rigidly mounted on the base 419 and surrounding the shaft 418. A suitable spring means (not shown) may be provided in connection with the push-off members 427 for retaining them in alignment with the guards 424 when out of the control of the detent 430, this spring means being compressed when the arm 429 strikes the detent 430, thus effecting a pushing off of any article or cullet which may be on the bottom plate 425.

Operation

Taking up the operation of the machine with respect to a single unit and understanding that the operation of the other seven units, as shown, is substantially identical with the one to be considered and following in suitable phase relation thereto, and starting at a place in the article forming cycle in which a completed article has just been discharged from the machine and the blank mold 122 is in its lower position and the press and blow head 175 is being raised. The first action which takes place is the resetting of the plunger 193 in its pressing position, which is done by the cam 262 abutting against the end 263 of the bell crank 244 and moving it to the right about its pivot 245. The blank mold 122 is then raised, moving the stop member 220 out of the path of movement of the cylinder 135. A charge of glass is then introduced by some suitable means (not shown) preferably from the feeder generally indicated at 36. This charge is directed into the blank mold 122, which has been raised effecting a closing of the neck ring halves 121. The press and blow head 175 is now lowered by movement of its cylinder 135 pressing the charge as shown in Fig. 4, the stripper ring 196 yielding to accommodate any over-charge of glass. The next operation is the tripping of the pressing plunger 193 and its movement upwardly under the influence of the spring 240, which may take place either by the lowering of the blank mold 122, as shown in Fig. 4, or by a suitable cam on the upper drum 12, as shown in Fig. 5. Substantially simultaneous with this tripping operation, the blank mold is lowered under control of the valve 163, in turn subject to the rotation of the turret. The piston 280 is then actuated within its cylinder 279 to supply puff-blowing air to the parison, which is now being rotated or oscillated as desired by the mechanism shown in detail in Fig. 10. The burner 324 may now be moved into operative position and serves to reheat the parison and/or to control its shape by the fluid pressure issuing from the burner nozzle. The surfaces of the parison may have chilled to a greater or less extent through contact with the mold and with the pressing plunger and require more or less reheating, which is accomplished by the burner 324 as described. The necking tool 354 is moved in at the desired time and serves to constrict the neck of the parison more or less according to the type of ware being produced, this operation and that of reheating and shaping the parison taking place during its rotation or oscillation. The necking tool 354 and burner 324 will then be moved out of their operative positions and the final blow mold comprising halves 368 moved to a position surrounding the parison, at which place it is closed and final blowing air is admitted to the parison to blow it out of its final shape. After the blowing has taken place for the desired time, the final blow mold is opened and moved to its inoperative position and the press and blow head 175 is raised, at which time the neck ring may be positively opened by the cover plate 127, as shown in Fig. 5, and the stripper ring 196 actuated to effect a stripping of the final article from the head. This stripping takes place at a position at which one of the receivers on the end of one of the arms of the spider 417 of the takeout mechanism is in alignment with the article and receives it as it is discharged from the neck ring, the turret and the spider continuing to rotate and the latter passing a position where the article may be taken off by hand or pushed off by the means above described.

The operation of the air supplying means is required to be timed with exactness with respect to the movements of the other parts and for this reason a specific description of the order of this operation will now be given. Referring to the form of the air supplying means shown in Figs. 16 and 17, the order of operation is as follows: first, the puff piston 280 moves almost to the end of its stroke to furnish puff blowing air to the parison; second, the puff piston 280 moves to the extreme end of its stroke to open the valve 297 controlling the flow of air from the diaphragm chamber, this action taking place at or shortly after the enclosing of the parison in the final blow mold; third, the diaphragm piston moves inward to supply final blowing air to the article, which is then enclosed in the final blow mold; fourth, after the discharge of the article and while the press and blow head 175 is in partially raised position, but before the resetting of the plunger at its lower or pressing position, the diaphragm moves inwardly to suck in heated air through the press and blow head; fifth, the puff piston also moves outward permitting the closing of the valve 297 and itself sucking in air through the press and blow head, all this taking place during the time the head 175 is moving upwardly and prior to the resetting of the plunger 193 by the cam 262; and lastly, the cylinder 135 moves to the extreme upper end of its stroke to reset the plunger 193 in its pressing position.

Referring to the preferred form of the mechanism shown in Figs. 9 and 18, the operation is as follows: first, the puff piston is moved inwardly to supply puff blowing air to the parison, but in this case the supply of final blowing air is entirely independent of the movement of the puff piston; second, the roll 321 rides onto a first step of its cam to operate the valve 316 to admit final blowing air to the parison, this movement taking place at or shortly after the time the parison is enclosed in the blow mold; third, the roll 321 rides on a higher portion of its cam and opens the vent 323 to vent the parison and to serve as a mode of egress for the air passing into the valve chamber through pipe 315; fourth, subsequent to the discharge of the final blown article, the roll 321 rides off of its cam and the valve 316 is entirely closed by the action of the spring 319; and last, the air is taken into the puff cylinder as described above.

While I have shown and described only a few possible modifications of my invention, it is obvious that many modifications might be made therein and many of the individual features might be used in other combinations without departing from the spirit of the invention as set forth in the appended claims, which are to be construed as broadly as the state of the prior art permits.

I claim:

1. In a machine for making blown glass articles, a continuous rotating turret, a support mounted thereon, a neck ring rotatably mounted in said support, automatic means adapted selectively to rotate or oscillate said neck ring in said support during the continuous rotation of said turret, and means for shifting from one of such movements to the other or for causing a cessation of both, all in response to the rotation of said turret.

2. In a machine for making blown glass articles, a continuously rotating turret, a support mounted thereon, a neck ring rotatably mounted in said support, automatic means adapted selectively to rotate or oscillate said neck ring in said support, means for rotating said turret, the said automatic means operating in response to the last named means to impart movement to said neck ring, and a clutch device having a component movable to any one of three positions to cause a rotation or oscillation of said neck ring or a cessation of both movements.

3. In a machine for making blown glass articles, a continuously rotating turret, a support mounted thereon, a neck ring rotatably mounted in said support, automatic means adapted selectively to rotate or oscillate said neck ring in said support, means for rotating said turret, the said automatic means operating in response to the last named means to impart movement to said neck ring, a clutch device having a component movable to any one of three positions to cause a rotation or oscillation of said neck ring or a cessation of both movements, and means operating in response to the rotation of said turret for moving said clutch component as desired.

4. Apparatus for making hollow glassware, comprising a support, a neck ring made up of complementary sections mounted on said support and movable to open and closed positions, a pressing plunger mounted for substantially vertical movement with respect to said support and cooperable with said neck ring to press a charge of glass therein, means associated with said pressing plunger for positively locking said neck ring sections in closed position, means for moving the last named means toward and away from neck ring locking position and means timed with respect to the movement of said last named means for positively causing said neck ring sections to move to their open position after a predetermined movement of said retaining means away from their position at which the neck ring halves are held closed and locked.

5. Apparatus for making hollow glassware comprising a support, a neck ring holder mounted in said support for rotary movement about a vertical axis, neck ring sections pivotally mounted in said holder on parallel horizontal axes, a combined press and blow head mounted on a vertical axis and cooperable with said neck ring, means for moving said head vertically into and out of cooperative relation with said neck ring, means associated with said head for locking said neck ring sections together in the operative position of said head, an annular cover plate pivoted to said support and adapted to overlie said neck ring, means on said holder for contact with said cover plate in any rotated position of said neck ring so arranged that when said head is raised unlocking said sections, the cover plate may be depressed positively to spread said sections, and means for depressing said cover plate after a predetermined rise of said head out of cooperative relation with said neck ring.

6. Apparatus for making hollow glassware, comprising a rotatable turret, a neck ring mounted thereon made up of complementary sections, a combined pressing and blowing head mounted for vertical movement with respect to said neck ring, means for moving said head vertically controlled by the rotation of said turret, said head cooperating with said neck ring to operate on a charge of glass held therein, means associated with said head for locking said neck ring sections in closed position during the time said head is in operative position with respect thereto, and means for positively moving said neck ring sections to their open position in response to the rotation of said turret after a predetermined movement of said head away from its operative position.

7. Apparatus for making hollow glassware, comprising a neck ring, a combined press and blow head cooperable therewith, an annular member surrounding said head and arranged to yield to accommodate an overcharge of glass, means for moving said head and said member as a unit toward and away from a position in operative relation with said neck ring, and positive cam-operated means effective after a predetermined retractive movement of said head from said neck ring for advancing said annular member with respect to said head to strip off a charge of glass which may adhere thereto.

8. Apparatus for making hollow glassware comprising a rotatable turret, a neck ring mounted thereon made up of complementary sections, a combined press and blow head mounted on said turret for cooperation with said neck ring and for vertical movement with respect thereto, a stripping member associated with said head, means controlled by the rotation of said turret for moving said head and associated parts vertically, means associated with said head for locking said neck ring sections in closed position during the time said head is in operative position with respect thereto, means for moving said neck ring sections to their open position in response to the rotation of said turret after a predetermined movement of said head away from its operative position, and means operative after a predetermined movement of said head away from its operative position for positively advancing said stripping member with respect to said head to strip off a formed glass article which may adhere thereto.

9. Apparatus for making hollow glassware, comprising a support, a neck ring made up of complementary movable sections mounted in said support, a blank mold supporting member movable in a substantially vertical direction, a blank mold vertically adjustably secured thereto, and means to move said blank mold and its supporting member to and from an operative position in contact with said neck ring, the parts being so constructed and arranged that movement of the blank mold to its operative position is effective to move said neck ring sections to their closed position and lock them against opening movement during the blank forming operation.

10. Apparatus for making hollow glassware, comprising a rotatable turret, a neck ring mounted thereon and made up of a plurality of relatively movable sections, a blank mold travelling with said turret and cooperable with said neck ring, a pneumatic cylinder mounted on said turret for effecting a substantially vertical movement of said blank mold, means controlled by the rotation of said turret for supplying pressure to said cylinder for moving said blank mold, and interengaging portions on said blank mold and neck ring respectively for causing the movement of said mold to its operative position to effect a closing of said neck ring sections.

11. Apparatus for making hollow glassware, comprising a support, a neck ring mounted on said support, a blank mold, means to move said blank mold vertically with respect to said neck ring into and out of cooperative relation with said neck ring, and means to move said blank mold laterally after it has moved a predetermined distance away from said neck ring in a vertical direction for permitting access to a blank held in said neck ring by further instrumentalities for operating on said blank, the last named means being operated by and as a result of the vertical movement of said blank mold.

12. Apparatus for making hollow glassware, comprising a rotatable turret, a neck ring mounted thereon, a fixed vertical shaft mounted below and adjacent to said neck ring, a piston on said shaft, a movable cylinder in which said piston operates, a blank mold secured to said cylinder and cooperable with said neck ring in the raised position of said cylinder, means operated by the rotation of said turret for controlling the admission of pneumatic pressure to said cylinder, and cam-operated means for moving said blank mold laterally after a predetermined downward movement from its operative position, whereby to permit access to a blank held in said neck ring by further instrumentalities for operating on said blank.

13. Apparatus for making hollow glassware, comprising a rotatable turret, a neck ring mounted thereon, a combined pressing and blowing head cooperable therewith, a pneumatic cylinder for moving said head vertically, means for moving said head laterally in response to its vertical movement and after a predetermined vertical movement away from said neck ring, a blank mold cooperable with said neck ring, a second pneumatic cylinder for moving said blank mold vertically, means for moving said blank mold laterally in response to its vertical movement and after a predetermined vertical movement away from said neck ring, and means for timing the action of both said cylinders in response to the rotation of said turret.

14. Apparatus for making glassware, comprising a neck ring, a blank mold, means to move said blank mold toward and away from a position in engagement with one side of said neck ring, a head, means to move said head toward and away from a position in engagement with the other side of said neck ring, and mechanical means effective positively to prevent said head moving into engagement with said neck ring prior to the movement of said blank mold to its neck ring engaging position.

15. Apparatus for making hollow glassware, comprising a neck ring, a blank mold, means to move said blank mold vertically toward and away from a position in engagement with the underside of said neck ring, a head, means to move said head vertically toward and away from a position in engagement with the upper side of said neck ring, a latch member normally positioned in the path of movement of said head moving means and adapted to prevent the movement of said head toward said neck ring, and interconnecting means between said latch member and said blank mold so arranged that movement of the latter to its neck ring engaging position is effective to move said latch member out of the path of said head moving means.

16. Apparatus for making hollow glassware, comprising a rotatable turret, a neck ring mounted thereon, a blank mold also mounted on the turret, pneumatic means to move said blank mold toward and away from a position in engagement with one side of said neck ring in response to the rotation of said turret, a press head, pneumatic means to move said press head toward and away from a position in engagement with the other side of said neck ring in response to the rotation of said turret, and mechanical means effective positively to prevent said head moving into engagement with said neck ring prior to the movement of said blank mold to its neck ring engaging position, whereby to prevent damage to the parts in the event of a failure of the pneumatic pressure.

17. Apparatus for making hollow glassware, comprising a neck ring, a blank mold, means to move said blank mold vertically toward and away from a position in engagement with the under side of said neck ring, a head, means to move said head vertically toward and away from a position in engagement with the upper side of said neck ring, a latch member adapted to be positioned in the path of movement of said blank mold moving means, means operated by said head for urging said latch member into such position when said head is in its neck ring engaging position, and means arranged to be released by the upward movement of said head for withdrawing said latch member from its position in the path of movement of the blank mold moving means.

18. Apparatus for making hollow glassware, comprising a rotatable turret, a neck ring mounted thereon, a blank mold also mounted on said turret, pneumatic means responsive to the rotation of said turret for moving said blank mold vertically toward and away from a position in engagement with the under side of said neck ring, a combined press and blow head mounted on said turret, pneumatic means responsive to the rotation of said turret for moving said head vertically into and out of a position in engagement with the upper side of the said neck ring, and interconnecting safety means between said head and said blank mold adapted to prevent the raising of said blank mold once it is lowered and until said head has been raised.

19. Apparatus for making hollow glassware, comprising a rotatable turret, a neck ring mounted thereon, a blank mold also mounted on said turret, means responsive to the rotation of said turret for moving said blank mold vertically toward and away from a position in engagement with the under side of said neck ring, a combined press and blow head mounted on said turret, means responsive to the rotation of said turret for moving said head vertically into and out of a position in engagement with the upper side of the said neck ring, the parts operating in a cycle in which the blank mold is first brought into engagement with the neck ring, a charge of glass is admitted thereto, said head is next brought down for pressing the charge of glass, the blank mold is then moved downwardly out of position in engagement with the neck ring, the charge of glass is blown to final form, and said head is raised completing the cycle; and interconnecting safety devices for insuring the above named cycle of events taking place in the order named, comprising inter-engaging latch members operating between said head and said blank mold.

20. Apparatus for making hollow glassware, comprising a rotatable turret, a neck ring mounted thereon for holding a glass parison, a blow head cooperating therewith and having a passage therein for conducting blowing air to the inside of said neck ring, a piston and cylinder mechanism operated by the rotation of said turret for supplying puff blowing air to said passage, a valve mechanism for controlling the flow of final blowing air to said passage, a venting duct associated with said valve mechanism for venting said passage at the termination of the final blowing operation, and means controlled by the rotation of said turret for operating said valve mechanism to admit final blowing air to and vent said passage as desired.

21. Apparatus for making hollow glassware, comprising a final blow mold made up of complementary sections pivoted on a common vertical axis, means for opening and closing said sections, a bottom plate for said mold pivoted on a horizontal axis passing through a point in alignment with said vertical axis, and means actuated by the means for opening and closing said sections for moving said bottom plate upwardly to its operative position on the closing of said sections for the final blowing of a glass article, said horizontal axis being substantially in the horizontal plane of said bottom plate when in its operative position.

22. Apparatus for making hollow glassware, comprising a final blow mold made up of complementary sections pivoted on a common vertical axis, means for opening and closing said sections, a bottom plate for said mold, a bell crank on one arm of which said bottom plate is mounted, and adjustable means associated with the means for opening and closing said sections for actuating the other arm of said bell crank to cause an upward movement of said bottom plate simultaneous with the closing of said sections.

23. Apparatus for making hollow glassware, comprising a rotatable turret, a parison support mounted thereon, an arm also mounted on said turret on a vertical axis, a mold mounted adjacent to the outer end of said arm and made up of a plurality of relatively movable sections, automatic means actuated as a result of the rotation of the turret for swinging said mold about said axis into and out of an operative position with respect to said support, and automatic means also actuated as a result of the rotation of the turret for opening and closing said sections.

24. Apparatus for making hollow glassware, comprising a rotatable turret, a parison support mounted thereon, an arm also mounted on said turret on a vertical axis, a final blow mold mounted adjacent to the outer end of said arm and made up of relatively movable complementary sections pivoted on a vertical axis adjacent to the outer end of said arm, and a bottom plate movable in a substantially vertical path toward and away from a closed position with said sections, means operating in response to the rotation of said turret for swinging the mold about the first named vertical axis into and out of an operative position with respect to a parison held in said support, and means operating also in response to the rotation of said turret for simultaneously closing said sections and elevating said bottom plate to enclose said parison.

25. Apparatus for making hollow glassware, comprising a neck ring made up of a plurality of complementary sections movable to open and closed positions, a blank mold mounted for movement toward and away from said neck ring, and interengaging portions on said neck ring sections and blank mold respectively for effecting a closing of said neck ring in response to the movement of said blank mold to its operative position.

26. Apparatus for making hollow glassware, comprising a support, a neck ring made up of complementary movable halves mounted in said support and movable to open and closed positions, a blank mold supporting member pivoted to said support for movement in a vertical plane, said supporting member being substantially in the horizontal plane of its pivot when the blank mold carried thereby is in operative position, the parts being so constructed and arranged that movement of the blank mold to its operative position is effective to move said neck ring halves to their closed position and lock them in closed position during the blank forming operation.

27. Apparatus for making hollow glassware, comprising a support, a neck ring rotatable therein about a vertical axis and made up of complementary halves pivotally mounted for movement in a vertical plane to open and closed positions, a blank mold mounted on said support for movement toward and away from said neck ring, said blank mold having bevel portions engaging the lower parts of said neck ring halves to move them to their closed position on movement of said blank mold toward its operative position, said bevel portions also locking the neck ring halves in closed position during the blank forming operation.

28. Apparatus for making hollow glassware comprising a continuously rotating turret, a parison support on said turret, a blow head cooperable therewith, a piston and cylinder for supplying puff blowing air to said head, means for moving the piston in said cylinder as a result of the rotation of said turret, including a stationary cam, and a roller movably mounted on said turret for cooperation with said cam, and means for adjustably determining the amount of movement of said piston in said cylinder for a given difference in level of different portions of said cam.

Signed at Hartford, Connecticut this 15th day of November, 1928.

ROBERT W. CANFIELD.